(12) United States Patent
Dambrine et al.

(10) Patent No.: US 7,101,154 B2
(45) Date of Patent: Sep. 5, 2006

(54) TURBOMACHINE BLADE, IN PARTICULAR A FAN BLADE, AND ITS METHOD OF MANUFACTURE

(75) Inventors: Bruno Dambrine, Le Chatelet en Brie (FR); Olivier Molinari, Avon (FR); Dominique Coupe, Le Haillan (FR)

(73) Assignee: Snecma Moteurs, Paris (FR)

( * ) Notice: Subject to any disclaimer, the term of this patent is extended or adjusted under 35 U.S.C. 154(b) by 124 days.

(21) Appl. No.: 10/965,912

(22) Filed: Oct. 18, 2004

(65) Prior Publication Data
US 2005/0084377 A1 Apr. 21, 2005

(30) Foreign Application Priority Data
Oct. 20, 2003 (FR) .................................. 03 12256

(51) Int. Cl.
*F04D 29/38* (2006.01)

(52) U.S. Cl. .................... 416/230; 442/205; 29/889.71

(58) Field of Classification Search ............ 416/223 R, 416/229 R, 230; 442/205, 206, 207, 203; 29/889.71, 889.7
See application file for complete search history.

(56) References Cited

U.S. PATENT DOCUMENTS

| | | | |
|---|---|---|---|
| 5,013,216 A | 5/1991 | Bailey et al. | |
| 5,222,297 A * | 6/1993 | Graff et al. | ............... 29/889.71 |
| 5,279,892 A | 1/1994 | Baldwin et al. | |
| 5,672,417 A | 9/1997 | Champenois et al. | |
| 6,431,837 B1 | 8/2002 | Velicki | |

FOREIGN PATENT DOCUMENTS

| | | |
|---|---|---|
| EP | 0 341 575 | 11/1989 |
| FR | 2 610 951 | 8/1988 |

* cited by examiner

*Primary Examiner*—Edward K. Look
*Assistant Examiner*—Dwayne J White
(74) *Attorney, Agent, or Firm*—Oblon, Spivak, McClelland, Maier & Neustadt, P.C.

(57) ABSTRACT

The composite turbomachine blade of the present invention comprises a preform made of yarns or fibers woven in three dimensions and a binder maintaining the relative disposition between the yarns of the preform. Said preform is made up of warp yarns and of weft yarns, the direction of the warp yarns forming the longitudinal direction of the preform. In characteristic manner, said preform comprises at least a first portion made using a first weave forming the airfoil of the blade, and a second portion made using a second weave forming the root of the blade, and the first and second portions are united by a transition zone in which the first weave is progressively modified to end up with the second weave, thereby obtaining a reduction at least in the thickness of the blade between the second portion and the first portion. The invention is applicable to making a fan blade for a turbojet.

15 Claims, 15 Drawing Sheets

TURBOMACHINE BLADE, IN PARTICULAR A FAN BLADE, AND ITS METHOD OF MANUFACTURE

The invention relates to a composite turbomachine blade comprising a preform of yarns or fibers woven in three dimensions and a binder maintaining the relative disposition between the yarns of the preform, said preform being made up of warp yarns and of weft yarns, the direction of the warp yarns forming the longitudinal direction of the preform.

In more particular manner, the present invention relates to a fan blade for a turbojet.

The present invention also relates to a method of manufacturing such blades.

BACKGROUND OF THE INVENTION

In usual manner, fan blades made of composite material, in particular using carbon fibers, are made from a stack of pre-impregnated unidirectional plies which are placed in a mold with the successive plies being oriented differently, prior to compacting and polymerizing in an autoclave. That technique is very difficult and requires plie-stacking operations to be performed manually, which is lengthy and expensive.

Proposals have also been made to prepare woven preforms using dry fibers which are subsequently assembled together by stitching, prior to being impregnated with resin by injection into a closed mold. An alternative has consisted in making a single woven preform which is assembled together with one or more solid inserts prior to injection. Those techniques (U.S. Pat. No. 5,672,417 and U.S. Pat. No. 5,013,216) nevertheless present the drawback of requiring a plurality of parts to assembled together and of creating, in such assemblies, zones constituting privileged sites for weakness, e.g. by delamination, which is very harmful in terms of mechanical strength, in particular for ability to withstand impacts.

OBJECTS AND SUMMARY OF THE INVENTION

An object of the present invention is to provide a preform of yarns or fibers woven in three dimensions and sufficing on its own, possibly after being cut to shape, and after injection, to constitute the final part forming the turbomachine blade, without requiring the use of inserts or any other fitted element.

Another object of the invention is to provide a blade comprising a preform of yarns or fibers woven in three dimensions and presenting mechanical characteristics that are non-uniform so as to take account of the differing stresses, in particular mechanical stresses, to which the two different portions for forming respectively the root and the body of the blade can be subjected.

To this end, according to the present invention, said preform comprises at least a first portion made with a first weave and forming the airfoil of the blade, and a second portion made using a second weave and forming the root of the blade, and the first portion and the second portion are united by a transition zone in which the first weave is progressively modified to end up with the second weave, thereby obtaining a reduction at least in the thickness of the blade between the second portion and the first portion.

In this way, it will be understood that by the presence of a first weave, corresponding to a first portion of the preform, and the presence of a second weave, corresponding to a second portion of the preform, two portions are made in succession by weaving continuously in a longitudinal direction, two portions having different weave patterns and thus different mechanical strength properties.

It will thus be understood, that because of the two weaves implemented in succession in such a preform, said first portion and said second portion are of differing size in at least one direction perpendicular to said longitudinal direction. This makes it possible to make a preform with dimensions in said direction (forming in particular the thickness of the blade), that differ between the first portion (blade body) and the second portion (blade root).

Advantageously, provision is made for said first portion and said second portion to present different numbers of warp yarns. This disposition makes it possible to emphasize the fact that the first portion and the second portion present different sizes in at least one direction perpendicular to said longitudinal direction.

Preferably, said yarns or fibers belong to the group constituted by carbon fibers, glass fibers, silica fibers, silicon carbide fibers, aluminum fibers, aramid fibers, and aromatic polyamide fibers.

In an highly advantageous disposition, the shrinkage angle of the warp yarns lies in the range 2° to 10°, whether in the first portion (blade body) or in the second portion (blade root). Thus, by means of this small value, strong cohesion is conserved between the warp yarns and the weft yarns woven between them in a three-dimensional configuration, thereby obtaining a blade having good impact strength, since the energy of the impact is easily absorbed, which means that any damage remains very localized.

In another advantageous disposition, said first portion and said second portion present different warp/weft volume ratios. This technique of modifying fiber density also presents the additional advantage of enabling the shrinkage angle (the angle between a warp yarn or a weft yarn relative to a horizontal plane) between the first weave (first portion) and the second weave (second portion) to be modified, which has a direct influence on the mechanical properties of the two corresponding portions, in particular on their moduluses of elasticity and on their impact strengths, and also on the relative thicknesses of the first and second portions.

Preferably, said first portion presents a warp/weft volume ratio lying in the range 80/20% to 50/50%, and said second portion presents a warp/weft volume ratio lying in the range 30/70% to 50/50%, preferably about 40/60%.

Also, in preferred and advantageous manner, the count of the warp yarns varies between the edge and the remainder of the blade, the warp yarns at the edge being finer, thus making it possible also to modify the mechanical properties of the blade between its surface and its central portion, both in the root (second portion) and in the body (second portion) of the blade.

Preferably, the count of the warp yarns at the edge of the blade is about 900 tex (yarns of 24,000 filaments) and the count of the warp yarns in the remainder of the blade is about 1800 tex (yarns of 48,000 filaments).

In a preferred embodiment, the first weave presents a base pattern comprising firstly at least thirty-six weft yarns disposed in a staggered configuration of columns having at least four weft yarns superposed in a vertical direction and spaced apart in a longitudinal direction by a step size, alternating with columns of at least five superposed weft yarns, the columns being separated by the same step size, the weft yarns being distributed in at least eight columns extending in a vertical direction, the weft yarns thus being disposed on at least nine levels, and secondly at least twenty-eight warp yarns disposed in at least eight vertical planes that are parallel to one another in a transverse direction alternating between planes of a first type containing at least four superposed parallel warp yarns, and planes of a second type containing at least three superposed parallel warp yarns, said planes of a first type having:

a first warp yarn connecting a top end weft yarn of a column of at least five weft yarns to the upper intermediate weft yarn of a column of at least five weft yarns spaced apart from the preceding column by at least two steps, and returning onto a top end weft yarn of a column of at least five weft yarns, spaced apart from the first column by at least four steps, a second warp yarn connecting an upper intermediate weft yarn of a column of at least five weft yarns to the middle weft yarn of a column of at least five weft yarns spaced apart from the preceding column by at least two steps, and returning onto an upper intermediate weft yarn of a column of at least five weft yarns, spaced apart from the first column by at least four steps, a third warp yarn connecting a middle weft yarn of a column of at least five weft yarns to the lower intermediate weft yarn of a column of at least five weft yarns spaced apart from the preceding column by at least two steps, and returning onto a middle weft yarn of a column of at least five weft yarns, spaced apart from the first column by at least four steps, a fourth warp yarn connecting a lower intermediate weft yarn of a column of at least five weft yarns to the bottom end weft yarn of a column of at least five weft yarns spaced apart from the preceding column by at least two steps, and returning onto a lower intermediate weft yarn of a column of at least five weft yarns, spaced apart from the first column by at least four steps, said planes of a second type having:

a first warp yarn connecting a top end weft yarn of a column of at least four weft yarns to the upper intermediate weft yarn of a column of at least four weft yarns spaced apart from the preceding column by at least two steps, and returning onto a top end weft yarn of a column of at least four weft yarns, spaced apart from the first column by at least four steps, a second warp yarn connecting an upper intermediate weft yarn of a column of at least four weft yarns to the lower intermediate weft yarn of a column of at least four weft yarns spaced apart from the preceding column by at least two steps, and returning onto an upper intermediate weft yarn of a column of at least four weft yarns, spaced apart from the first column by at least four steps, a third warp yarn connecting a lower intermediate weft yarn of a column of at least four weft yarns to the bottom end weft yarn of a column of at least four weft yarns spaced apart from the preceding column by at least two steps, and returning onto a lower intermediate weft yarn of a column of at least four weft yarns, spaced apart from the first column by at least four steps.

Also, in a preferred embodiment, the second weave presents a base pattern comprising firstly at least forty-five weft yarns disposed in a staggered configuration of columns of at least four weft yarns superposed in a vertical direction, the columns being separated in a longitudinal direction by a step size, and being in a staggered configuration relative to columns of at least five superposed weft yarns, the columns being separated by the same step size, the weft yarns being distributed in at least ten-columns extending in a vertical direction, the weft yarns thus being disposed on at least nine levels, and secondly at least forty warp yarns disposed in at least ten vertical planes that are parallel to one another in a transverse direction, each plane containing at least four superposed parallel warp yarns with alternating planes of a first type and planes of a second type, said planes of a first type having:

a first warp yarn connecting a top end weft yarn of a column of at least five weft yarns to the top end weft yarn of a column of at least four weft yarns spaced apart from the preceding column by at least two and a half steps, and returning onto a top end weft yarn of a column of at least five weft yarns, spaced apart from the first column by at least five steps, a second warp yarn connecting an upper intermediate weft yarn of a column of at least five weft yarns to the upper intermediate weft yarn of a column of at least four weft yarns spaced apart from the preceding column by at least two and a half steps, and returning onto an upper intermediate weft yarn of a column of at least five weft yarns, spaced apart from the first column by at least five steps, a third warp yarn connecting a middle weft yarn of a column of at least five weft yarns to the lower intermediate weft yarn of a column of at least four weft yarns spaced apart from the preceding column by at least two and a half steps, and returning onto a middle weft yarn of a column of at least five weft yarns, spaced apart from the first column by at least five steps, a fourth warp yarn connecting a lower intermediate weft yarn of a column of at least five weft yarns to the bottom end weft yarn of a column of at least four weft yarns spaced apart from the preceding column by at least two and a half steps, and returning onto a lower intermediate weft yarn of a column of at least five weft yarns, spaced apart from the first column by at least five steps, said planes of a second type having:

a first warp yarn connecting a top end weft yarn of a column of at least four weft yarns to the upper intermediate weft yarn of a column of at least five weft yarns spaced apart from the preceding column by at least two and a half steps, and returning onto a top end weft yarn of a column of at least four weft yarns, spaced apart from the first column by at least five steps, a second warp yarn connecting an upper intermediate weft yarn of a column of at least four weft yarns to the middle weft yarn of a column of at least five weft yarns spaced apart from the preceding column by at least two and a half steps, and returning onto an upper intermediate weft yarn of a column of at least four weft yarns, spaced apart from the first column by at least five steps, a third warp yarn connecting a lower intermediate weft yarn of a column of at least four weft yarns to the lower intermediate weft yarn of a column of at least five weft yarns spaced apart from the preceding column by at least two and a half steps, and returning onto a lower intermediate weft yarn of a column of at least four weft yarns, spaced apart from the first column by at least five steps, a fourth warp yarn connecting a bottom end weft yarn of a column of at least four weft yarns to the bottom end weft yarn of a column of at least five weft yarns spaced apart from the preceding column by at least two and a half steps, and returning onto a bottom end weft yarn of a column of at least four weft yarns, spaced apart from the first column by at least five steps, the parallel groups of four warp yarns being offset longitudinally by a step of the same size as the step from one plane to the adjacent plane.

In another advantageous disposition, the second portion of the blade presents a core zone with weft yarns that are larger, having a count that is different from that of the weft yarns surrounding said core zone.

In which case, provision is preferably made for the count of the weft yarns in the core zone of the second portion of the blade to be about 3600 tex (yarns of 96,000 filaments) and the count of the weft yarns surrounding said core zone to be about 1800 tex (yarns of 48,000 filaments).

Preferably, said binder belongs to the group formed by organic resins, refractory substances, and metals.

Also, provision is advantageously made for said blade of the invention to be a fan blade for a turbojet.

Finally, the present invention also provides a method of manufacturing a fan blade for a turbojet, the method comprising the following steps:
  weaving warp yarns and weft yarns so as to form a preform of yarns or fibers that is woven in three dimensions, being made up of warp yarns and weft yarns, the direction of the warp yarns forming the longitudinal direction of the preform, said preform including at least a first portion made with a first weave (A) and a second portion made with a second weave (B), said first portion and said second portion being united by a transition zone in which the first weave is progressively modified to end up with the second weave, thereby obtaining a reduction at least in the thickness of the blade between the second portion and the first portion;
  cutting said preform to the shape and dimensions of the component portions of the blade;
  providing a mold in which said preform is placed;
  injecting a binder into said mold in order to impregnate the entire preform the binder comprising a thermosetting resin;
  heating said mold; and
  extracting a molded part from the mold.

BRIEF DESCRIPTION OF THE DRAWINGS

Other advantages and characteristics of the invention will appear on reading the following description made by way of example and with reference to the accompanying drawings, in which.

MORE DETAILED DESCRIPTION

In the description below, the longitudinal direction, the transverse direction, and the vertical direction correspond respectively to the directions of arrows x, y, and z in the figures.

Figure 1:
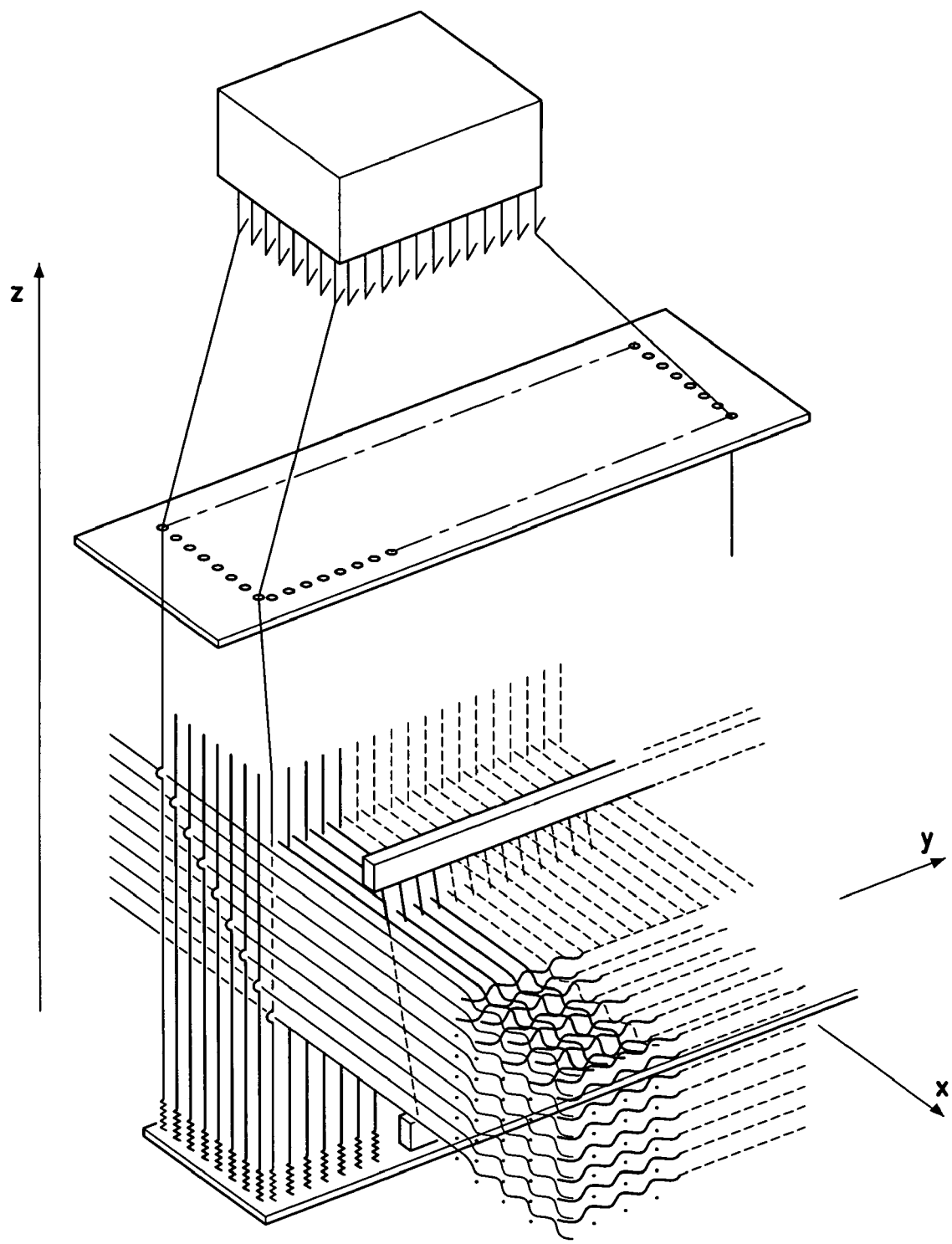
FIG. 1 is a diagram of a Jacquard-type loom capable of weaving a preform of the invention in three dimensions.
Figure 2:
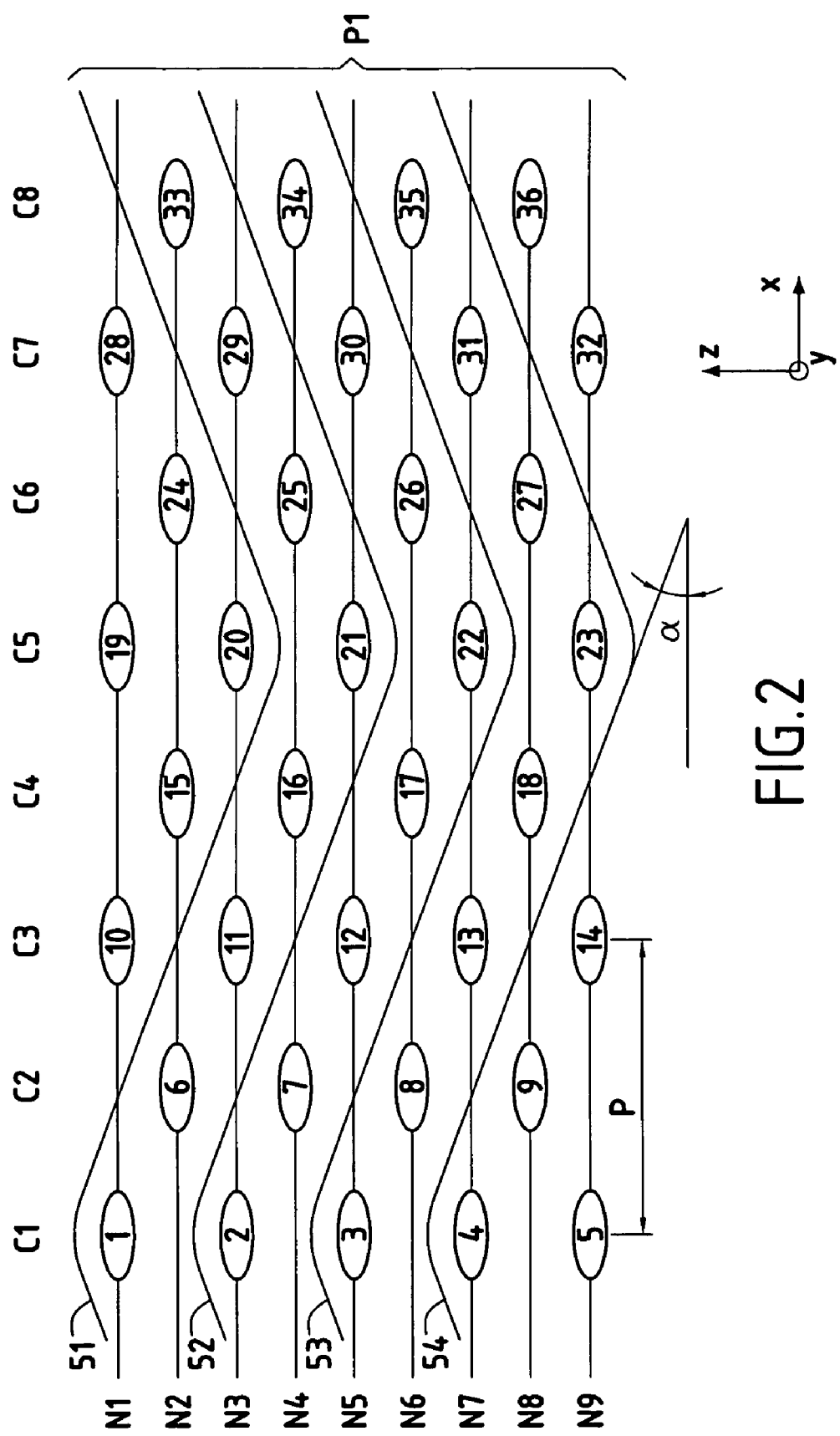
FIG. 2 is a diagrammatic section in the longitudinal and vertical directions showing the weft yarns and the warp yarns contained in a first plane of the first weave.
Figure 3:
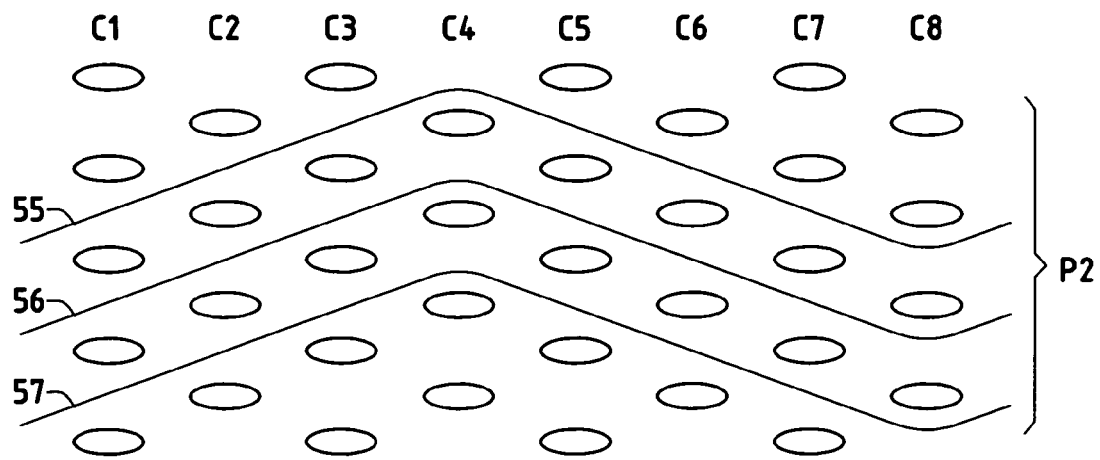
FIGS. 3 to 9 are views similar to the view of FIG. 2 showing the weft yarns and the warp yarns contained respectively in a second plane, a third plane, a fourth plane, a fifth plane, a sixth plane, a seventh plane, and an eighth plane of the first weave, these planes being parallel to the first plane of FIG. 2.
Figure 4:
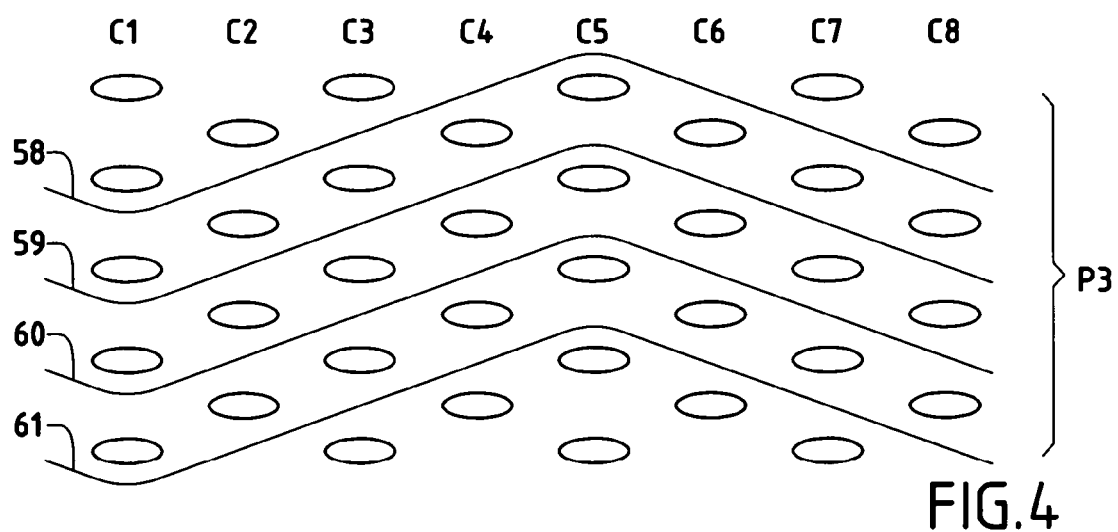
Figure 5:
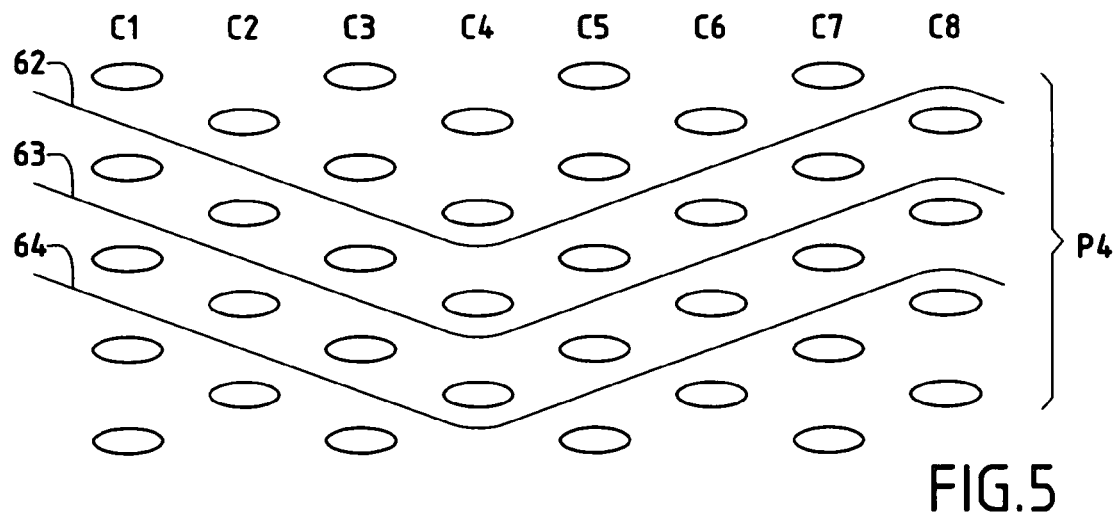
Figure 6:
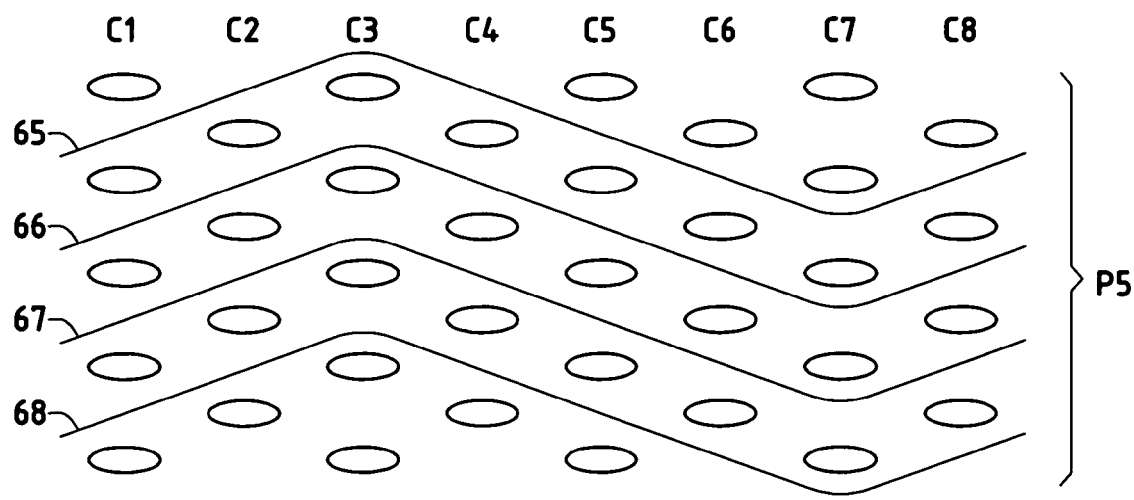
Figure 7:
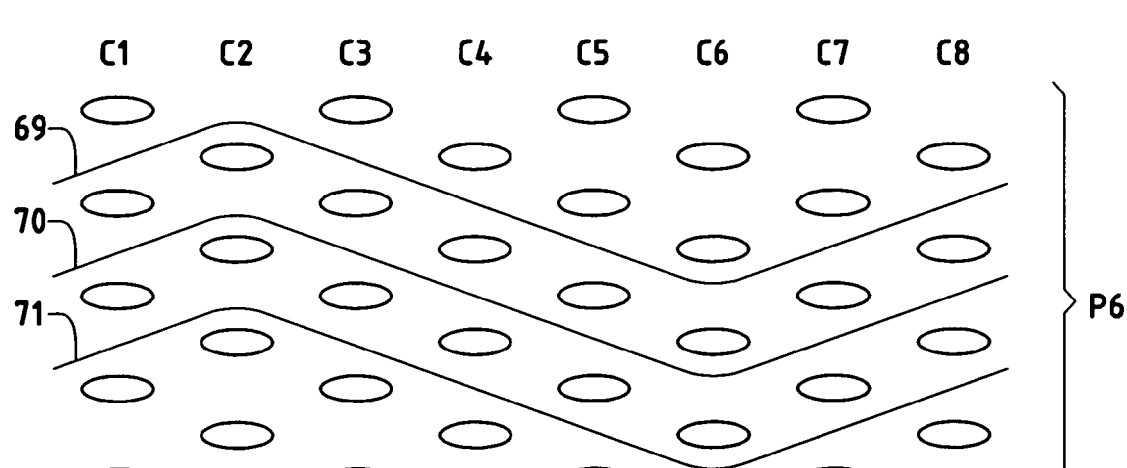
Figure 8:
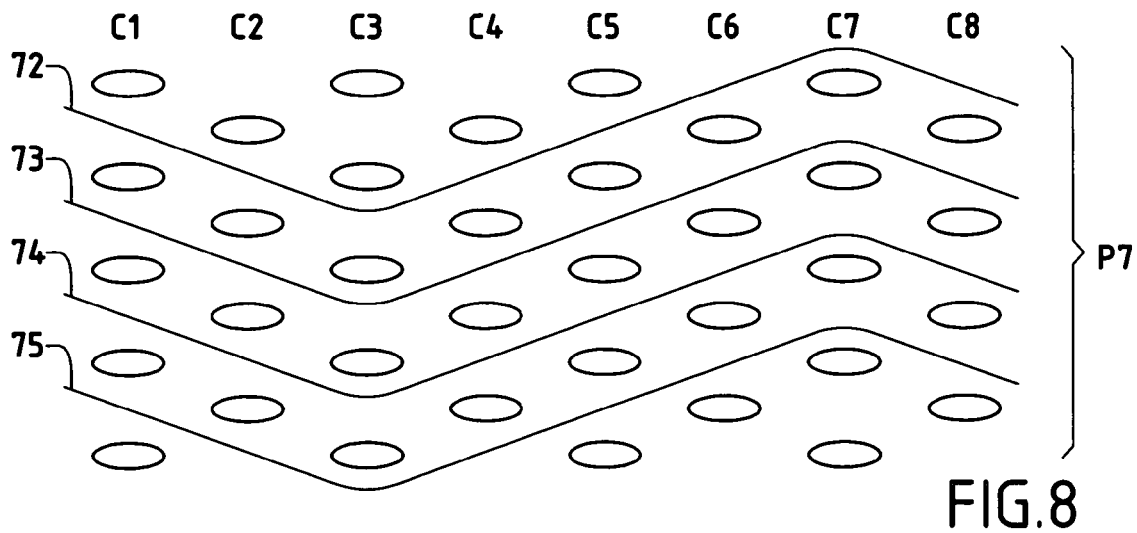
Figure 9:
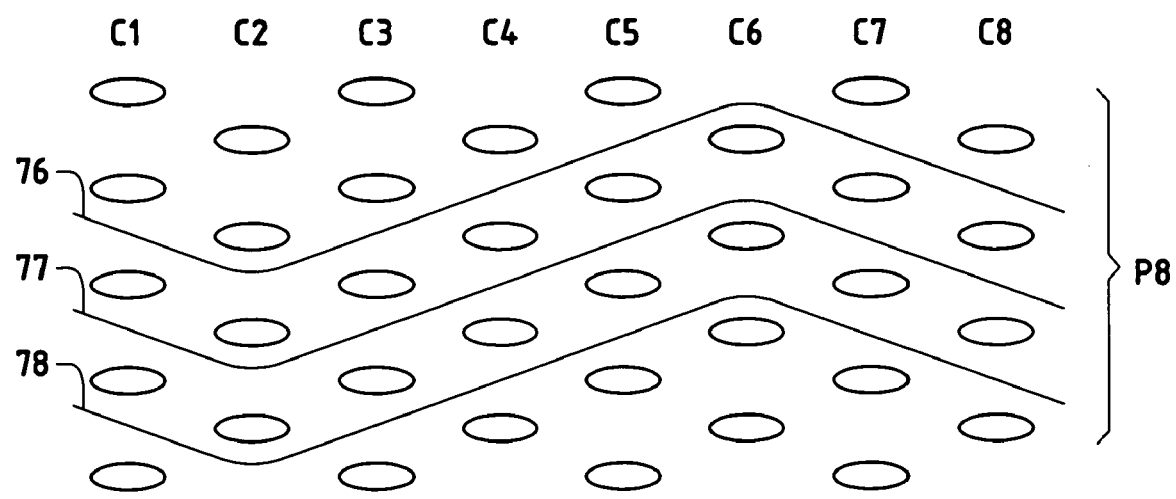
Figure 10:
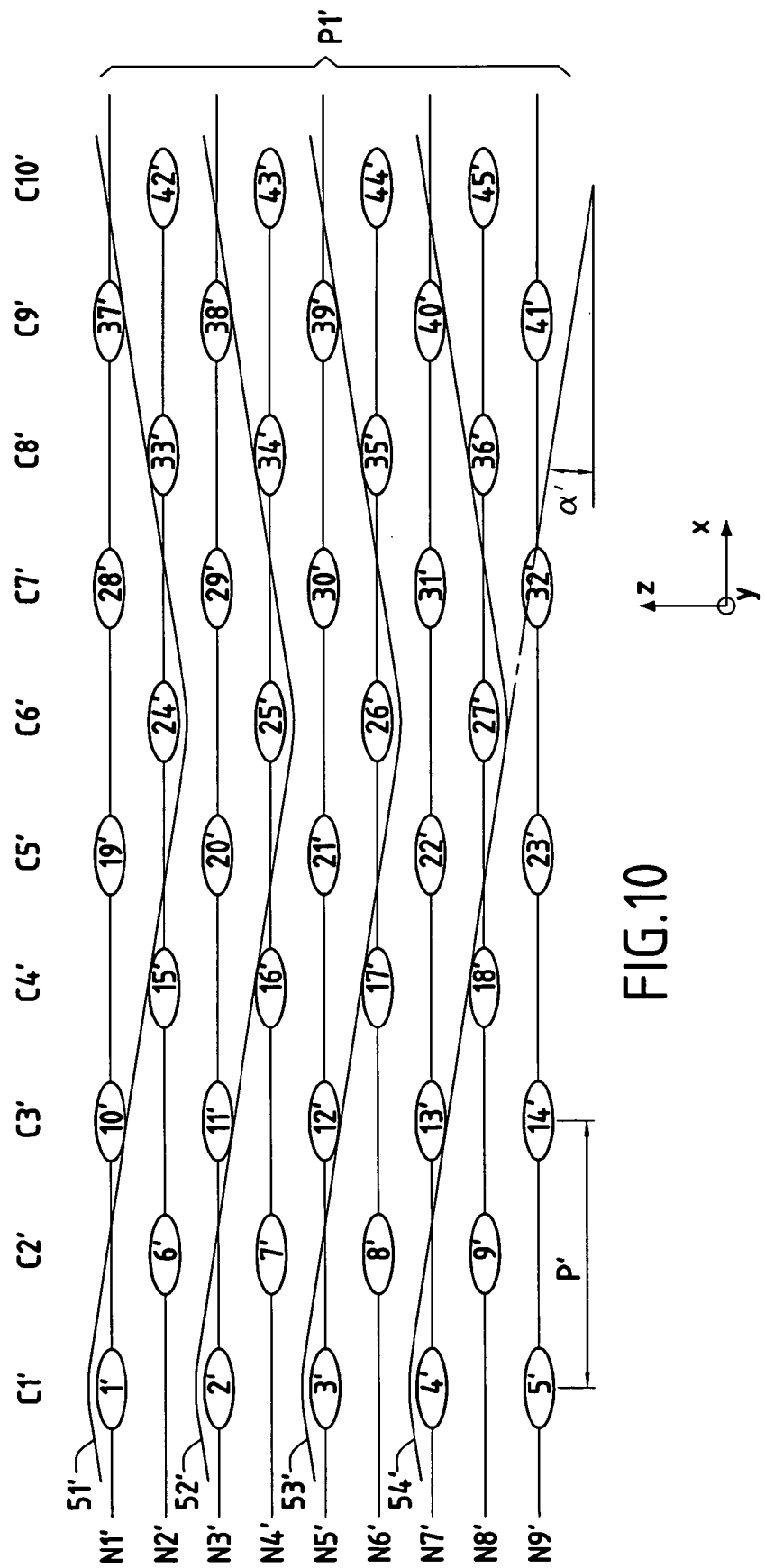
FIGS. 10 to 19 are views similar to FIG. 2 showing the weft yarns and the warp yarns contained in a first plane, a second plane, a third plane, a fourth plane, a fifth plane, a sixth plane, a seventh plane, an eighth plane, a ninth plane, and a tenth plane of the second wave.
Figure 11:
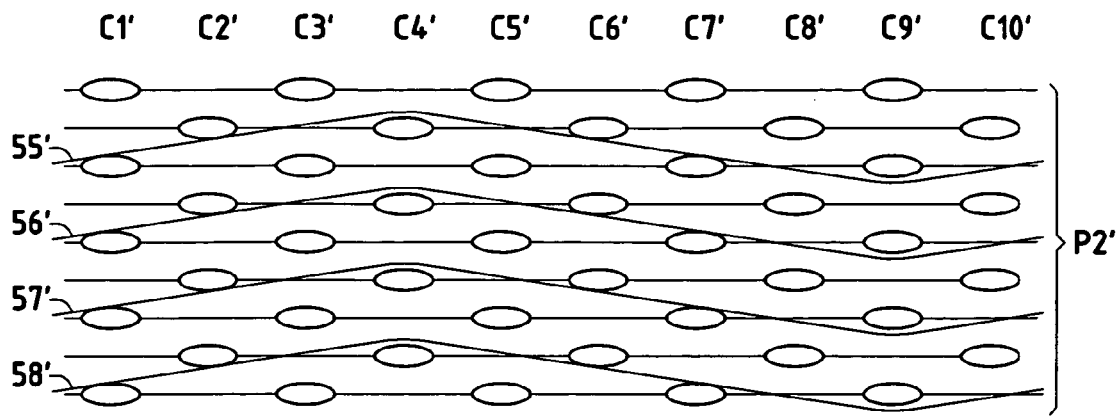
Figure 12:
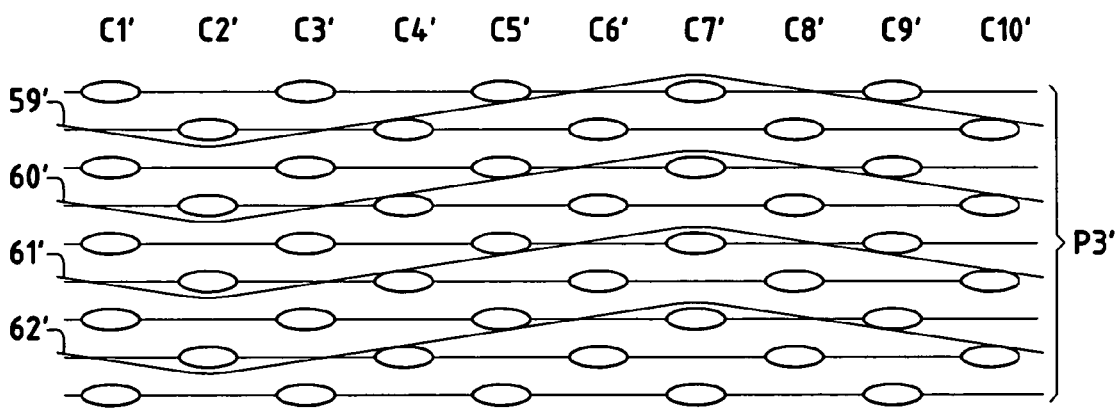
Figure 13:
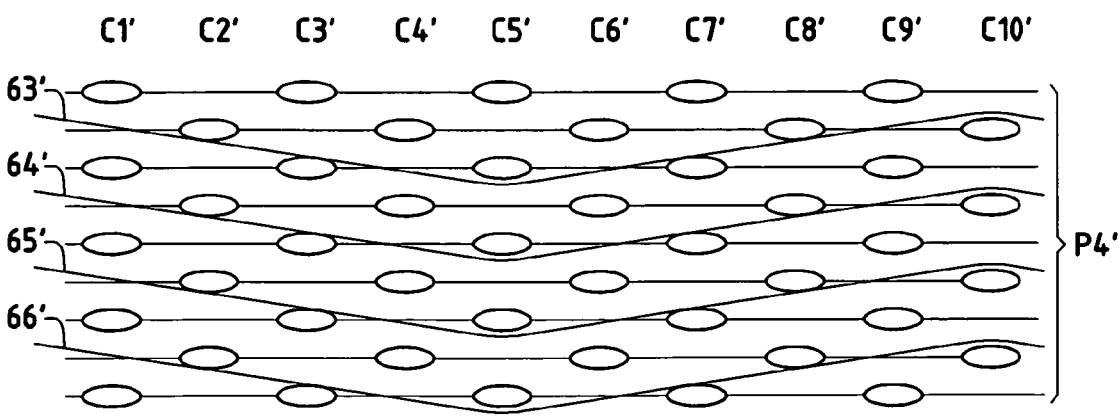
Figure 14:
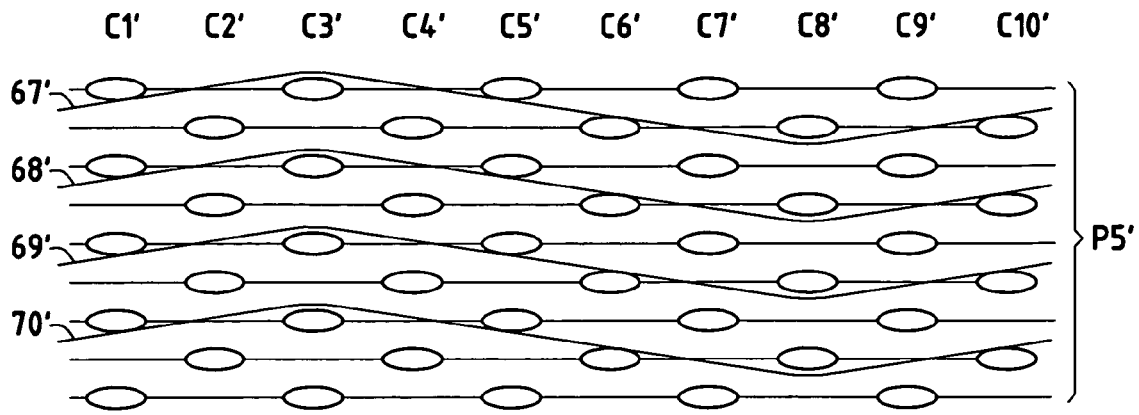
Figure 15:
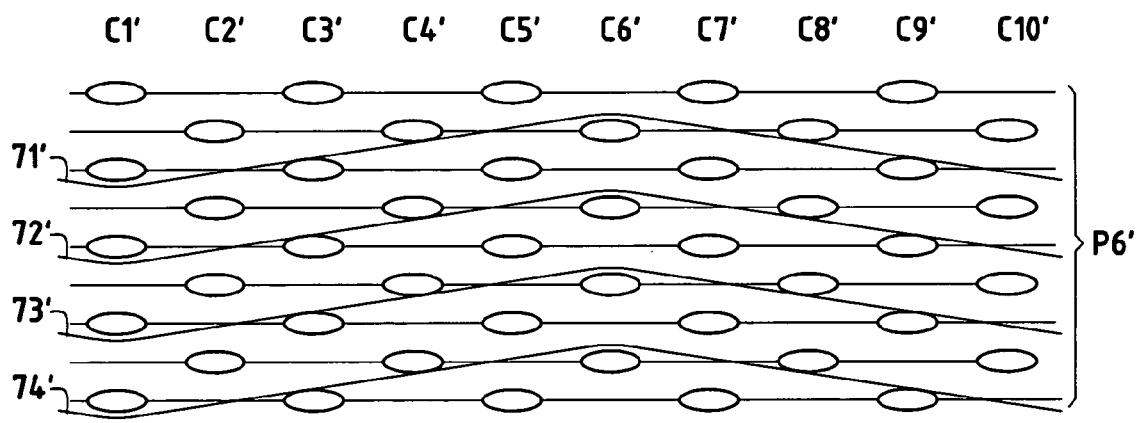
Figure 16:
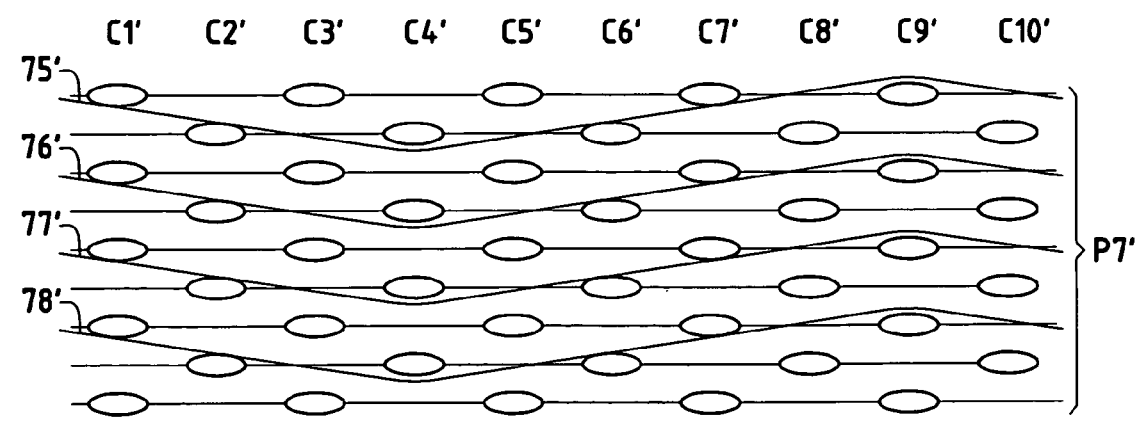
Figure 17:
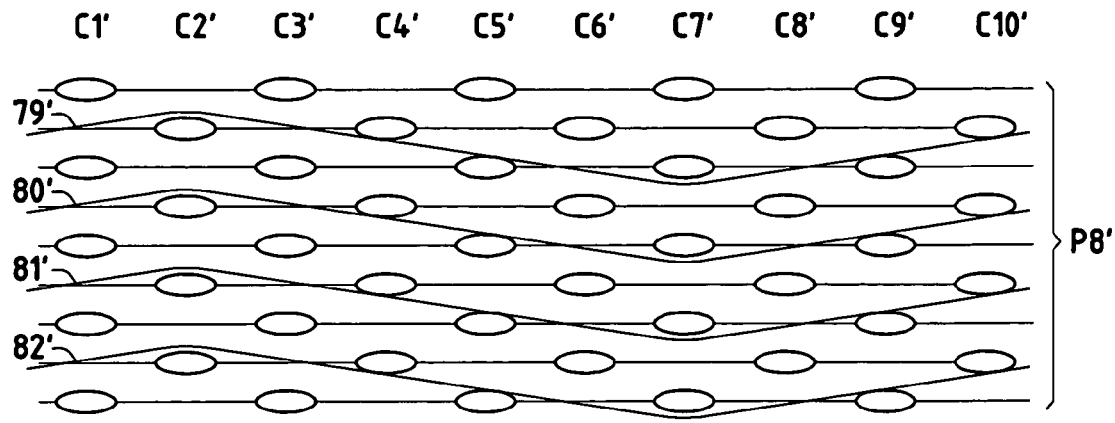
Figure 18:
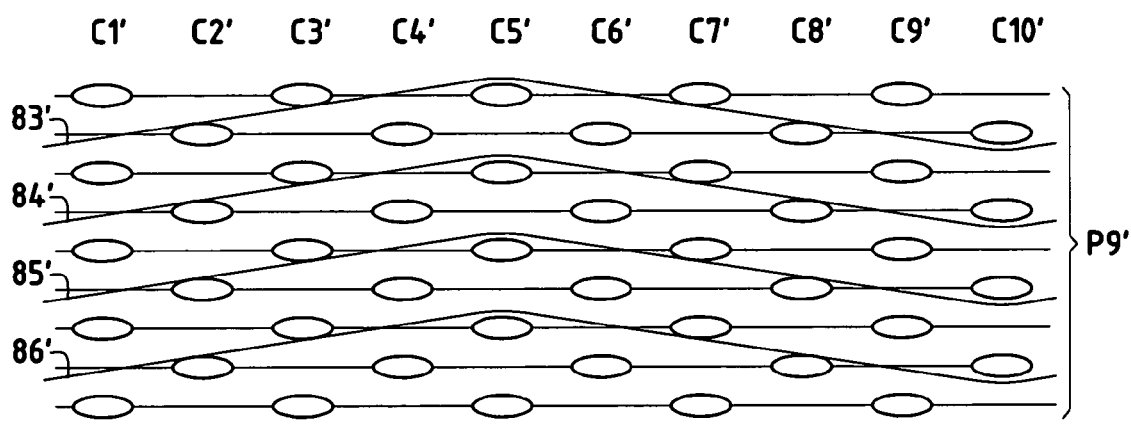
Figure 19:
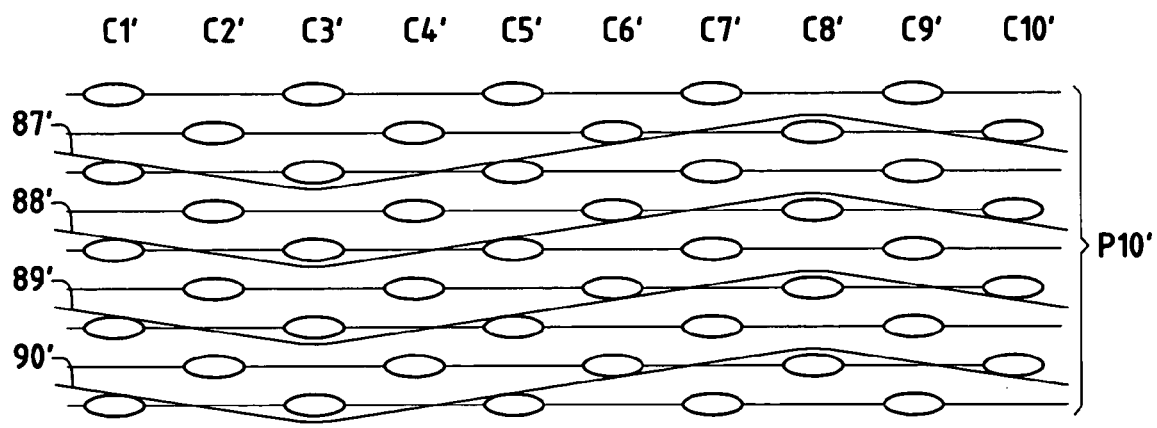

FIG. 1 is a diagram showing a Jacquard-type loom having the warp yarns mounted thereon which are oriented in the longitudinal direction (arrow x) and which extend in a plurality of layers superposed in the vertical direction (arrow z), together with the weft yarns which are oriented in the transverse direction (arrow y).

FIGS. 2 to 9 show the base pattern of the first weave for a preform in accordance with the present invention. This first weave comprises thirty-six weft yarns 1 to 36 (i.e. they are shown in section) disposed in a staggered configuration on nine superposed levels N1 to N9, and distributed in eight columns C1 to C8, comprising:
  a first column C1 of five superposed weft yarns 1 to 5 situated respectively at levels N1, N3, N5, N7, and N9;
  a second column C2 of four superposed weft yarns 6 to 9 situated respectively at levels N2, N4, N6, and N8;
  a third column C3 of five superposed weft yarns 10 to 14 situated respectively at levels N1, N3, N5, N7, and N9;
  a fourth column C4 of four superposed weft yarns 15 to 18 situated respectively at levels N2, N4, N6, and N8;
  a fifth column C5 of five superposed weft yarns 19 to 23 situated respectively at levels N1, N3, N5, N7, and N9;
  a sixth column C6 of four superposed weft yarns 24 to 27 situated respectively at levels N2, N4, N6, and N8;
  a seventh column C7 of five superposed weft yarns 28 to 32 situated respectively at levels N1, N3, N5, N7, and N9; and
  an eighth column C8 of four superposed weft yarns 33 to 36 situated respectively at levels N2, N4, N6, and N8.

The odd columns C1, C3, C5, and C7 made up of five superposed weft yarns are separated from one another by constant gaps in the longitudinal direction, corresponding to a predetermined step size P. The same step size P separates the even columns C2, C4, C6, C8 each made up of four superposed weft yarns, which are interposed between the preceding columns, these four weft yarns being disposed in a staggered configuration relative to the five weft yarns of each of the two adjacent odd columns.

This base pattern for the first weave is repeated in the longitudinal direction (warp yarn direction), in the transverse direction (weft yarn direction), and in the vertical direction (thickness direction), forming sheets.

The weft yarns 1 to 36 are interconnected by twenty-eight warp yarns 51 to 78 which are disposed in eight parallel planes P1 to P8 that can be seen in FIGS. 2 to 9 respectively and that are oriented in the longitudinal and vertical directions (arrows x and z).

The planes P1 to P8 follow one another in the transverse direction, being regularly spaced apart between one another at a step size which is always constant and lies in the range 1.5 millimeters (mm) to 3 mm, and is preferably equal to 2.1 mm.

Each of these planes P1 to P8 contains three or four parallel superposed warp yarns, with the disposition in each plane being as follows:

In the plane P1 (FIG. 2), a first warp yarn 51 connects the top end weft yarn 1 of the column C1 to the upper intermediate weft yarn 20 of the column C5 (downwards), and it returns (upwards) onto the top end weft yarn, corresponding to the yarn 1 in the following base pattern. A second warp yarn 52 connects the upper intermediate weft yarn 2 of the column C1 to the middle weft yarn 21 of the column C5 (downwards), and it returns (upwards) onto the upper intermediate weft yarn, corresponding to the yarn 2 in the following base pattern. A third warp yarn 53 connects the middle weft yarn 3 of the column C1 to the lower intermediate weft yarn 22 of the column C5 (downwards), and it returns (upwards) onto the middle weft yarn, corresponding to the yarn 3 in the following base pattern. A fourth warp yarn 54 connects the lower intermediate weft yarn 4 of the column C1 to the bottom end weft yarn 23 of the column C5 (downwards), and it returns (upwards) onto the lower intermediate weft yarn, corresponding to the yarn 4 in the following base pattern.

In the plane P2 (FIG. 3), a first warp yarn 55 connects the top end weft yarn 15 of the column C4 to the upper intermediate weft yarn 34 of the column C8 (downwards), and it returns (upwards) onto the top end weft yarn, corresponding to the yarn 15 in the following base pattern. A second warp yarn 56 connects the upper intermediate weft yarn 16 of the column C4 to the lower intermediate weft yarn 35 of the column C8 (downwards), and it returns (upwards) onto the upper intermediate weft yarn, corresponding to the yarn 16 in the following base pattern. A third warp yarn 57 connects the lower intermediate weft yarn 17 of the column C4 to the bottom end weft yarn 36 of the column C8 (downwards), and it returns (upwards) onto the lower intermediate weft yarn, corresponding to the yarn 17 in the following base pattern.

In the plane P3 (FIG. 4), a first warp yarn 58 connects the top end weft yarn 19 of the column C5 to the upper intermediate weft yarn 2 of the column C1 (downwards) in the following base pattern, and it returns (upwards) onto the top end weft yarn, corresponding to the yarn 19 in the following base pattern. A second warp yarn 59 connects the upper intermediate weft yarn 20 of the column C5 to the middle weft yarn 3 of the column C1 (downwards) in the following base pattern, and it returns (upwards) onto the upper intermediate weft yarn, corresponding to the yarn 20 in the following base pattern. A third warp yarn 60 connects the middle weft yarn 21 of the column C5 to the lower intermediate weft yarn 4 of the column C3 (downwards) in the following base pattern, and it returns (upwards) onto the middle weft yarn, corresponding to the yarn 21 in the following base pattern. A fourth warp yarn 61 connects the lower intermediate weft yarn 22 of the column C1 to the bottom end weft yarn 5 of the column C1 (downwards) in the following base pattern, and it returns (upwards) onto the lower intermediate weft yarn, corresponding to the yarn 22 in the following base pattern.

In the plane P4 (FIG. 5), a first warp yarn 62 connects the top end weft yarn 33 of the column C8 to the upper intermediate weft yarn 16 of the column C4 (downwards) in the following base pattern, and it returns (upwards) onto the top end weft yarn, corresponding to the yarn 33 in the following base pattern. A second warp yarn 63 connects the upper intermediate weft yarn 34 of the column C8 to the lower intermediate weft yarn 17 of the column C4 (downwards) in the following base pattern, and it returns (upwards) onto the upper intermediate weft yarn, corresponding to the yarn 34 in the following base pattern. A third warp yarn 64 connects the lower intermediate weft yarn 35 of the column C8 to the bottom end weft yarn 18 of the column C4 (downwards) in the following base pattern, and it returns (upwards) onto the lower intermediate weft yarn, corresponding to the yarn 35 in the following base pattern.

In the plane P5 (FIG. 6), a first warp yarn 65 connects the top end weft yarn 10 of the column C3 to the upper intermediate weft yarn 29 of the column C7 (downwards), and it returns (upwards) onto the top end weft yarn, corresponding to the yarn 10 in the following base pattern. A second warp yarn 66 connects the upper intermediate weft yarn 11 of the column C3 to the middle weft yarn 30 of the column C7 (downwards), and it returns (upwards) onto the upper intermediate weft yarn, corresponding to the yarn 11 in the following base pattern. A third warp yarn 67 connects the middle weft yarn 12 of the column C3 to the lower intermediate weft yarn 31 of the column C7 (downwards), and it returns (upwards) onto the middle weft yarn, corresponding to the yarn 12 in the following base pattern. A fourth warp yarn 68 connects the lower intermediate weft yarn 13 of the column C3 to the bottom end weft yarn 32 of the column C7 (downwards), and it returns (upwards) onto the lower intermediate weft yarn, corresponding to the yarn 13 in the following base pattern.

In the plane P6 (FIG. 7), a first warp yarn 69 connects the top end weft yarn 6 of the column C2 to the upper intermediate weft yarn 25 of the column C6 (downwards), and it returns (upwards) onto the top end weft yarn, corresponding to the yarn 6 in the following base pattern. A second warp yarn 70 connects the upper intermediate weft yarn 7 of the column C2 to the lower intermediate weft yarn 26 of the column C6 (downwards), and it returns (upwards) onto the upper intermediate weft yarn, corresponding to the yarn 7 in the following base pattern. A third warp yarn 71 connects the lower intermediate weft yarn 8 of the column C2 to the bottom end weft yarn 27 of the column C6 (downwards), and it returns (upwards) onto the lower intermediate weft yarn, corresponding to the yarn 8 in the following base pattern.

In the plane P7 (FIG. 8), a first warp yarn 72 connects the top end weft yarn 28 of the column C7 to the upper intermediate weft yarn 11 of the column C3 (downwards) in the following base pattern, and it returns (upwards) onto the top end weft yarn, corresponding to the yarn 28 in the following base pattern. A second warp yarn 73 connects the upper intermediate weft yarn 29 of the column C7 to the middle weft yarn 12 of the column C3 (downwards) in the following base pattern, and it returns (upwards) onto the upper intermediate weft yarn, corresponding to the yarn 29 in the following base pattern. A third warp yarn 74 connects the middle weft yarn 30 of the column C7 to the lower intermediate weft yarn 13 of the column C3 (downwards) in the following base pattern, and it returns (upwards) onto the middle weft yarn, corresponding to the yarn 30 in the following base pattern. A fourth warp yarn 75 connects the lower intermediate weft yarn 31 of the column C7 to the bottom end weft yarn 14 of the column C3 (downwards) in the following base pattern, and it returns (upwards) onto the lower intermediate weft yarn, corresponding to the yarn 31 in the following base pattern.

Finally, in the plane P8 (FIG. 9), a first warp yarn 76 connects the top end weft yarn 24 of the column C6 to the upper intermediate weft yarn 7 of the column C2 (downwards) in the following base pattern, and it returns (upwards) onto the top end weft yarn, corresponding to the yarn 24 in the following base pattern. A second warp yarn 77 connects the upper intermediate weft yarn 25 of the column C6 to the lower intermediate weft yarn 8 of the column C2 (downwards) in the following base pattern, and it returns (upwards) onto the upper intermediate weft yarn, corresponding to the yarn 25 in the following base pattern. A third warp yarn 78 connects the lower intermediate weft yarn 26 of the column C6 to the bottom end weft yarn 9 of the column C2 (downwards) in the following base pattern, and it returns (upwards) onto the lower intermediate weft yarn, corresponding to the yarn 26 in the following base pattern.

It should be observed in passing that from one plane to another, adjacent plane, the pattern alternates between a configuration having three parallel warp yarns (planes of a first type (P1, P3, P5, P7)) and a configuration having four parallel warp yarns (planes of a second type (P2, P4, P6, P8)), these configurations being offset in the longitudinal direction (arrow x in FIG. 2) in irregular manner: 1.5 P between P1 and P2; 0.5 P between P2 and P3; 1.5 P between P3 and P4; 1.5 P between P4 and P5; −0.5 P between P5 and P6; −1.5 P between P6 and P7; and −0.5 P between P7 and P8, when P is in the step size.

Thus, a first weave (A) is obtained that presents a base pattern comprising exactly thirty-six weft yarns (1 to 36) disposed in an alternating configuration of columns (C2, C4, C6, C8) of exactly four weft yarns superposed in a vertical direction and separated in the longitudinal direction by a step size (P), alternating with columns (C1, C3, C5, C7) of exactly five superposed weft yarns separated from one another in the longitudinal direction by a step of the same size (P). The weft yarns (1 to 36) are distributed in exactly eight columns (C1 to C8) extending in a vertical direction, the weft yarns (1 to 36) thus being disposed on exactly nine levels (N1 to N9). The base pattern of the first weave also corresponds to exactly twenty-eight warp yarns (51 to 78) disposed one exactly eight parallel vertical planes (P1 to P8) between one another in the transverse direction, with the planes alternating between planes of a first type (P1, P3, P5, P7) containing exactly four superposed parallel warp yarns, and planes of a second type (P2, P4, P6, P8) containing exactly three superposed parallel warp yarns.

Said planes of a first type (P1, P3, P5, P7) present:

a first warp yarn (51, 58, 65, 72) connecting a top end weft yarn (1, 19, 10, 28) of a column (C1, C5, C3, C7) of exactly five weft yarns to the upper intermediate weft yarn (20, 2, 29, 11) of a column (C5, C1, C7, C3) of exactly five weft yarns spaced apart from the preceding column by exactly two steps (P), and returning onto a top end weft yarn (1, 19, 10, 28)) of a column (C1, C5, C3, C7) of exactly five weft yarns, spaced apart from the first column by exactly four steps (P), a second warp yarn (52, 59, 66, 73) connecting an upper intermediate weft yarn (2, 20, 11, 29) of a column (C1, C5, C3, C7) of exactly five weft yarns to the middle weft yarn (21, 3, 30, 12) of a column (C5, C1, C7, C3) of exactly five weft yarns spaced apart from the preceding column by exactly two steps (P), and returning onto an upper intermediate weft yarn (2, 20, 11, 29) of a column (C1, C5, C3, C7) of exactly five weft yarns, spaced apart from the first column by exactly four steps (P), a third warp yarn (53, 60, 67, 74) connecting a middle weft yarn (3, 21, 12, 30) of a column (C1, C5, C3, C7) of exactly five weft yarns to the lower intermediate weft yarn (22, 4, 31, 13) of a column (C5, C1, C7, C3) of exactly five weft yarns spaced apart from the preceding column by exactly two steps (P), and returning onto a middle weft yarn (3, 21, 12, 30) of a column (C1, C5, C3, C7) of exactly five weft yarns, spaced apart from the first column by exactly four steps (P), a fourth warp yarn (54, 61, 68, 75) connecting a lower intermediate weft yarn (4, 22, 13, 31) of a column (C1, C5, C3, C7) of exactly five weft yarns to the bottom end weft yarn (23, 5, 32, 14) of a column (C5, C1, C7, C3) of exactly five weft yarns spaced apart from the preceding column by exactly two steps (P), and returning onto a lower intermediate weft yarn (4, 22, 13, 31) of a column (C1, C5, C3, C7) of exactly five weft yarns, spaced apart from the first column by exactly four steps (P).

Said planes of a second type (P2, P4, P6, P8) present:

a first warp yarn (55, 62, 69, 76) connecting a top end weft yarn (15, 33, 6, 24) of a column (C4, C8, C2, C6) of exactly four weft yarns to the upper intermediate weft yarn (34, 16, 25, 7) of a column (C8, C4, C6, C2) of exactly four weft yarns spaced apart from the preceding column by exactly two steps (P), and returning onto a top end weft yarn (15, 33, 6, 24) of a column (C4, C8, C2, C6) of exactly four weft yarns, spaced apart from the first column by exactly four steps (P), a second warp yarn (56, 63, 70, 77) connecting an upper intermediate weft yarn (16, 34, 7, 25) of a column (C4, C8, C2, C6) of exactly four weft yarns to the lower intermediate weft yarn (35, 17, 26, 8) of a column (C8, C4, C6, C2) of exactly four weft yarns spaced apart from the preceding column by exactly two steps (P), and returning onto an upper intermediate weft yarn (16, 34, 7, 25) of a column (C4, C8, C2, C6) of exactly four weft yarns, spaced apart from the first column by exactly four steps (P), a third warp yarn (57, 64, 71, 78) connecting a lower intermediate weft yarn (17, 35, 8, 24) of a column (C4, C8, C2, C6) of exactly four weft yarns to the bottom end weft yarn (36, 18, 27, 9) of a column (C4, C8, C2, C6) of exactly four weft yarns spaced apart from the preceding column by exactly two steps (P), and returning onto a lower intermediate weft yarn (17, 35, 8, 24) of a column (C4, C8, C2, C6) of exactly four weft yarns, spaced apart from the first column by exactly four steps (P).

FIGS. 10 to 19 show the base pattern of the second weave of a preform in accordance with the present invention. This second weave comprises forty-five weft yarns 1' to 45' (they are shown in section), disposed in a staggered configuration on nine superposed levels N1' to N9', and distributed in ten columns C1' to C10', comprising:

a first column C1' of five superposed weft yarns 1' to 5' situated respectively at levels N1', N3', N5', N7', and N9';

a second column C2' of four superposed weft yarns 6' to 9' situated respectively at the levels N2', N4', N6', and N8';

a third column C3' of five superposed weft yarns 10' to 14' situated respectively at levels N1', N3', N5', N7', and N9';

a fourth column C4' of four superposed weft yarns 15' to 18' situated respectively at the levels N2', N4', N6', and N8';

a fifth column C5' of five superposed weft yarns 19' to 23' situated respectively at levels N1', N3', N5', N7', and N9';

a sixth column C6' of four superposed weft yarns 24' to 27' situated respectively at the levels N2', N4', N6', and N8';

a seventh column C7' of five superposed weft yarns 28' to 32' situated respectively at levels N1', N3', N5', N7', and N9';

an eighth column C8' of four superposed weft yarns 33' to 36' situated respectively at the levels N2', N4', N6', and N8';

a ninth column C9' of five superposed weft yarns 37' to 41' situated respectively at levels N1', N3', N5', N7', and N9'; and a tenth column C10' of four superposed weft yarns 42' to 45' situated respectively at the levels N2', N4', N6', and N8'.

The odd columns C1', C3', C5', C7', and C9', each made up of five superposed weft yarns are separated from one another by constant gaps in the longitudinal direction, corresponding to the step size P' which remains identical throughout a given plane Pi but which differs from one plane Pi to another, adjacent plane along the planes P1' to P10'(it can be considered that this step size P' varies during weaving).

The same step size P' separates the even columns C2', C4', C6', C8', and C10' each formed of four superposed weft yarns, which are interposed between the above-described columns, these four weft yarns being disposed in a staggered configuration relative to the five weft yarns of the two adjacent odd columns.

It should be observed that the step size P' would in fact be equal to the step size P of the first weave if the first and second weaves presented identical weft/warp volume ratios.

This base pattern for the second weave is repeated in the longitudinal direction (warp yarn direction), in the transverse direction (weft yarn direction), and in the vertical direction (thickness direction), forming sheets.

The weft yarns 1' to 45' are interconnected by forty warp yarns 51' to 90' which are disposed in ten parallel planes P1' to P10' that are shown in FIGS. 10 to 19, respectively.

The planes P1' to P10' follow one another in the transverse direction, being regularly offset from one another by a step size lying in the range 1.5 mm to 3 mm, and preferably being equal to 2.1 mm.

Each of these planes P1' to P10' contains four superposed parallel warp yarns, with the disposition of each plane being as follows:

In the plane P1' (FIG. 10), a first warp yarn 51' connects the top end weft yarn 1' of the column C1' to the top end weft yarn 24' of the column C6' (downwards), and it returns (upwards) onto the top end weft yarn, corresponding to the yarn 1' in the following base pattern. A second warp yarn 52' connects the upper intermediate weft yarn 2' of the column C1' to the upper intermediate weft yarn 25' of the column C6' (downwards), and it returns (upwards) onto the upper intermediate weft yarn, corresponding to the yarn 2' in the following base pattern. A third warp yarn 53' connects the middle weft yarn 3' of the column C1' to the lower intermediate weft yarn 26' of the column C6' (downwards), and it returns (upwards) onto the middle weft yarn, corresponding to the yarn 3' in the following base pattern. A fourth warp yarn 54' connects the lower intermediate weft yarn 4' of the column C1' to the bottom end weft yarn 27' of the column C6' (downwards), and it returns (upwards) onto the lower intermediate weft yarn, corresponding to the yarn 4' in the following base pattern.

In the plane P2' (FIG. 11), a first warp yarn 55' connects the top end weft yarn 15' of the column C4' to the upper intermediate weft yarn 38' of the column C9' (downwards), and it returns (upwards) onto the top end weft yarn, corresponding to the yarn 15' in the following base pattern. A second warp yarn 56' connects the upper intermediate weft yarn 16' of the column C4' to the middle weft yarn 39' of the column C9' (downwards), and it returns (upwards) onto the upper intermediate weft yarn, corresponding to the yarn 16' in the following base pattern. A third warp yarn 57' connects the lower intermediate weft yarn 17' of the column C4' to the lower intermediate weft yarn 40' of the column C9' (downwards), and it returns (upwards) onto the lower intermediate weft yarn, corresponding to the yarn 17' in the following base pattern. A fourth warp yarn 58' connects the bottom end weft yarn 18' of the column C4' to the bottom end weft yarn 41' of the column C9' (downwards), and it returns (upwards) onto the bottom end weft yarn, corresponding to the yarn 18' in the following base pattern.

In the plane P3' (FIG. 12), a first warp yarn 59' connects the top end weft yarn 28' of the column C7' to the top end weft yarn 6' of the column C2' (downwards) in the following base pattern, and it returns (upwards) onto the top end weft yarn, corresponding to the yarn 28' in the following base pattern. A second warp yarn 60' connects the upper intermediate weft yarn 29' of the column C7' to the upper intermediate weft yarn 7' of the column C2' (downwards) in the following base pattern, and it returns (upwards) onto the upper intermediate weft yarn, corresponding to the yarn 29' in the following base pattern. A third warp yarn 61' connects the middle weft yarn 30' of the column C7' to the lower intermediate weft yarn 8' of the column C2' (downwards) in the following base pattern, and it returns (upwards) onto the middle weft yarn, corresponding to the yarn 30' in the following base pattern. A fourth warp yarn 62' connects the lower intermediate weft yarn 31' of the column C7' to the bottom end weft yarn 9' of the column C2' (downwards) in the following base pattern, and it returns (upwards) onto the lower intermediate weft yarn, corresponding to the yarn 31' in the following base pattern.

In the plane P4' (FIG. 13), a first warp yarn 63' connects the top end weft yarn 42' of the column C10' to the upper intermediate weft yarn 20' of the column C5' (downwards) in the following base pattern, and it returns (upwards) onto the top end weft yarn, corresponding to the yarn 42' in the following base pattern. A second warp yarn 64' connects the upper intermediate weft yarn 43' of the column C10' to the middle weft yarn 21' of the column C5' (downwards) in the following base pattern, and it returns (upwards) onto the upper intermediate weft yarn, corresponding to the yarn 43' in the following base pattern. A third warp yarn 65' connects the lower intermediate weft yarn 44' of the column C10' to the lower intermediate weft yarn 22' of the column C5' (downwards) in the following base pattern, and it returns (upwards) onto the lower intermediate weft yarn, corresponding to the yarn 44' in the following base pattern. A fourth warp yarn 66' connects the bottom end weft yarn 45' of the column C10' to the bottom end weft yarn 23' of the column C5' (downwards) in the following base pattern, and it returns (upwards) onto the lower intermediate weft yarn, corresponding to the yarn 45' in the following base pattern.

In the plane P5' (FIG. 14), a first warp yarn 67' connects the top end weft yarn 10' of the column C3' to the top end weft yarn 33' of the column C8' (downwards), and it returns (upwards) onto the top end weft yarn, corresponding to the yarn 10' in the following base pattern. A second warp yarn 68' connects the upper intermediate weft yarn 11' of the column C3' to the upper intermediate weft yarn 34' of the column C8' (downwards), and it returns (upwards) onto the upper intermediate weft yarn, corresponding to the yarn 11' in the following base pattern. A third warp yarn 69' connects the middle weft yarn 12' of the column C3' to the lower intermediate weft yarn 35' of the column C8' (downwards), and it returns (upwards) onto the middle weft yarn, corresponding to the yarn 12' in the following base pattern. A fourth warp yarn 70' connects the lower intermediate weft yarn 13' of the column C3' to the bottom end weft yarn 36' of the column C8' (downwards), and it returns (upwards) onto the lower intermediate weft yarn, corresponding to the yarn 13' in the following base pattern.

In the plane P6' (FIG. 15), a first warp yarn 71' connects the top end weft yarn 24' of the column C6' to the upper intermediate weft yarn 2' of the column C1' (downwards) in the following base pattern, and it returns (upwards) onto the top end weft yarn, corresponding to the yarn 24' in the following base pattern. A second warp yarn 72' connects the upper intermediate weft yarn 25' of the column C6' to the middle weft yarn 3' of the column C1' (downwards), and it returns (upwards) onto the upper intermediate weft yarn, corresponding to the yarn 25' in the following base pattern. A third warp yarn 73' connects the lower intermediate weft yarn 26' of the column C6' to the lower intermediate weft yarn 4' of the column C1' (downwards) in the following base pattern, and it returns (upwards) onto the lower intermediate weft yarn, corresponding to the yarn 26' in the following base pattern. A fourth warp yarn 74' connects the bottom end weft yarn 27' of the column C6' to the bottom end weft yarn 5' of the column C1' (downwards) in the following base pattern, and it returns (upwards) onto the bottom end weft yarn, corresponding to the yarn 27' in the following base pattern.

In the plane P7' (FIG. 16), a first warp yarn 75' connects the top end weft yarn 37' of the column C9' to the top end weft yarn 15' of the column C4' (downwards) in the following base pattern, and it returns (upwards) onto the top end weft yarn, corresponding to the yarn 37' in the following base pattern. A second warp yarn 76' connects the upper intermediate weft yarn 38' of the column C9' to the upper intermediate weft yarn 16' of the column C4' (downwards) in the following base pattern, and it returns (upwards) onto the upper intermediate weft yarn, corresponding to the yarn 38' in the following base pattern. A third warp yarn 77' connects the middle weft yarn 39' of the column C9' to the lower intermediate weft yarn 17' of the column C4' (downwards) in the following base pattern, and it returns (upwards) onto the middle weft yarn, corresponding to the yarn 39' in the following base pattern. A fourth warp yarn 78' connects the lower intermediate weft yarn 40' of the column C9' to the bottom end weft yarn 18' of the column C4' (downwards) in the following base pattern, and it returns (upwards) onto the lower intermediate weft yarn, corresponding to the yarn 40' in the following base pattern.

In the plane P8' (FIG. 17), a first warp yarn 79' connects the top end weft yarn 6' of the column C2' to the upper intermediate weft yarn 29' of the column C7' (downwards), and it returns (upwards) onto the top end weft yarn, corresponding to the yarn 6' in the following base pattern. A second warp yarn 80' connects the upper intermediate weft yarn 7' of the column C2' to the middle weft yarn 30' of the column C7' (downwards), and it returns (upwards) onto the upper intermediate weft yarn, corresponding to the yarn 7' in the following base pattern. A third warp yarn 81' connects the lower intermediate weft yarn 8' of the column C2' to the lower intermediate weft yarn 31' of the column C7' (downwards), and it returns (upwards) onto the lower intermediate weft yarn, corresponding to the yarn 8' in the following base pattern. A fourth warp yarn 82' connects the bottom end weft yarn 9' of the column C2' to the bottom end weft yarn 32' of the column C7' (downwards), and it returns (upwards) onto the bottom end weft yarn, corresponding to the yarn 9' in the following base pattern.

In the plane P9' (FIG. 18), a first warp yarn 83' connects the top end weft yarn 19' of the column C5' to the top end weft yarn 42' of the column C10' (downwards), and it returns (upwards) onto the top end weft yarn, corresponding to the yarn 19' in the following base pattern. A second warp yarn 84' connects the upper intermediate weft yarn 20' of the column C5' to the upper intermediate weft yarn 43' of the column C10' (downwards), and it returns (upwards) onto the upper intermediate weft yarn, corresponding to the yarn 20' in the following base pattern. A third warp yarn 85' connects the middle weft yarn 21' of the column C5' to the lower intermediate weft yarn 44' of the column C10' (downwards), and it returns (upwards) onto the middle weft yarn, corresponding to the yarn 21' in the following base pattern. A fourth warp yarn 86' connects the lower intermediate weft yarn 22' of the column C5' to the bottom end weft yarn 45' of the column C10' (downwards), and it returns (upwards) onto the lower intermediate weft yarn, corresponding to the yarn 22' in the following base pattern.

Finally, in the plane P10' (FIG. 19), a first warp yarn 87' connects the top end weft yarn 33' of the column C8' to the upper intermediate weft yarn 11' of the column C3' (downwards) in the following base pattern, and it returns (upwards) onto the top end weft yarn, corresponding to the yarn 33' in the following base pattern. A second warp yarn 88' connects the upper intermediate weft yarn 34' of the column C8' to the middle weft yarn 12' of the column C3' (downwards), and it returns (upwards) onto the upper intermediate weft yarn, corresponding to the yarn 34' in the following base pattern. A third warp yarn 89' connects the lower intermediate weft yarn 35' of the column C8' to the lower intermediate weft yarn 13' of the column C3' (downwards) in the following base pattern, and it returns (upwards) onto the lower intermediate weft yarn, corresponding to the yarn 35' in the following base pattern. A fourth warp yarn 90' connects the bottom end weft yarn 36' of the column C8' to the bottom end weft yarn 14' of the column C3' (downwards) in the following base pattern, and it returns (upwards) onto the bottom end weft yarn, corresponding to the yarn 36' in the following base pattern.

It can be seen from these FIGS. 10 to 19 that the contraction angle $\alpha'$ (or warp shrinkage angle) of the warp yarns is smaller in the second weave than is the connection angle $\alpha$ in the first weave (FIGS. 2 to 9). In this respect, it should be observed that for reasons of clarity the figures are not to scale, and the angles $\alpha$ and $\alpha'$ which can be seen in FIGS. 2 to 19 do not correspond to real values.

It should be observed that for the second weave, going from one plane to another, adjacent plane, there can be found the same configuration of four parallel warp yarns offset in regular manner in the transverse direction at 1.5 times the step size P'. Naturally, in this case also, the base pattern of the second weave defined on ten planes can be repeated indefinitely in the longitudinal direction, in the transverse direction, and in the vertical direction (the weft yarns 1' to 45' forming sheets).

Thus, a second weave (B) is obtained which presents a base pattern comprising exactly forty-five weft yarns (1' to 45') disposed in a staggered configuration that alternates between columns (C2', C4', C6', C8', C10') of exactly four weft yarns superposed in a vertical direction, and separated in the longitudinal direction by one step (P'), and columns (C1', C3', C5', C7', C9') of exactly five superposed weft yarns, that are separated from one another in the longitudinal direction by the steps of the same size (P'). The weft yarns (1' to 45') are distributed in exactly two columns (C1' to C10') extending in a vertical direction, the weft yarns (1' to 45') thus being disposed on exactly nine levels (N1' to N9'). The base pattern of the second weave also comprises exactly forty warp yarns (51' to 90') disposed on exactly ten vertical planes that are parallel to one another (P1' to P10') in the transverse direction, each plane containing exactly four superposed parallel warp yarns, with alternation between planes of a first type (P1', P3', P5', P7', P9') and planes of a second type (P2', P4', P6', P8', P10').

Said planes of a first type (P1', P3', P5', P7', P9') present:
  a first warp yarn (51', 59', 67', 75', 83') connecting a top end weft yarn (1', 28', 10', 37', 19') of a column (C1', C7', C3', C9', C5') of exactly five weft yarns to the top end weft yarn (24', 6', 33', 15', 42') of a column (C6', C2', C8', C4', C10') of exactly four weft yarns spaced apart from the preceding column by exactly two and a half steps (P'), and returning onto a top end weft yarn (1', 28', 10', 37', 19') of a column (C1', C7', C3', C9', C5') of exactly five weft yarns, spaced apart from the first column by exactly five steps (P'),
  a second warp yarn (52', 60', 68', 76', 84') connecting an upper intermediate weft yarn (2', 29', 11', 38', 20') of a column (C1', C7', C3', C9', C5') of exactly five weft yarns to the upper intermediate weft yarn (25', 7', 34', 16', 43') of a column (C6', C2', C8', C4', C10') of exactly four weft yarns spaced apart from the preceding column by exactly two and a half steps (P'), and returning onto an upper intermediate weft yarn (2', 29', 11', 38', 20') of a column (C1', C7', C3', C9', C5') of exactly five weft yarns, spaced apart from the first column by exactly five steps (P'),
  a third warp yarn (53', 61', 69', 77', 85') connecting a middle weft yarn (3', 30', 12', 39', 21') of a column (C1', C7', C3', C9', C5') of exactly five weft yarns to the lower intermediate weft yarn (26', 8', 35', 17', 44') of a column (C6', C2', C8', C4', C10') of exactly four weft yarns spaced apart from the preceding column by exactly two and a half steps (P'), and returning onto a middle weft yarn (3', 30', 12', 39', 21') of a column (C1', C7', C3', C9', C5') of exactly five weft yarns, spaced apart from the first column by exactly five steps (P'),
  a fourth warp yarn (54', 62', 70', 78', 86') connecting a lower intermediate weft yarn (4', 31', 13', 40', 22') of a column (C1', C7', C3', C9', C5') of exactly five weft yarns to the bottom end weft yarn (27', 9', 36', 18', 45') of a column (C6', C2', C8', C4', C10') of exactly four weft yarns spaced apart from the preceding column by exactly two and a half steps (P'), and returning onto a lower intermediate weft yarn (4', 31', 13', 40', 22') of a column (C1', C7', C3', C9', C5') of exactly five weft yarns, spaced apart from the first column by exactly five steps (P').

Said planes of a second type (P2', P4', P6', P8', P10') present:
  a first warp yarn (55', 63', 71', 79', 87') connecting a top end weft yarn (15', 42', 24', 6', 33') of a column (C4', C10', C6', C2', C8') of exactly four weft yarns to the upper intermediate weft yarn (38', 20', 2', 29', 11') of a column (C9', C5', C1', C7, C3') of exactly five weft yarns spaced apart from the preceding column by exactly two and a half steps (P'), and returning onto a top end weft yarn (15', 42', 24', 6', 33') of a column (C4', C10', C6', C2', C8') of exactly four weft yarns, spaced apart from the first column by exactly five steps (P'),
  a second warp yarn (56', 64', 72', 80', 88') connecting an upper intermediate weft yarn (16', 43', 25', 7', 34') of a column (C4', C10', C6', C2', C8') of exactly four weft yarns to the middle weft yarn (39', 21', 3', 30', 12') of a column (C9', C5', C1', C7, C3') of exactly five weft yarns spaced apart from the preceding column by exactly two and a half steps (P'), and returning onto an upper intermediate weft yarn (16', 43', 25', 7', 34') of a column (C4', C10', C6', C2', C8') of exactly four weft yarns, spaced apart from the first column by exactly five steps (P'),
  a third warp yarn (57', 65', 73', 81', 89') connecting a lower intermediate weft yarn (17', 44', 26', 8', 35') of a column (C4', C10', C6', C2', C8') of exactly four weft yarns to the lower intermediate weft yarn (40', 22', 4', 31', 13') of a column (C9', C5', C1', C7, C3') of exactly five weft yarns spaced apart from the preceding column by exactly two and a half steps (P'), and returning onto a lower intermediate weft yarn (17', 44', 26', 8', 35') of a column (C4', C10', C6', C2', C8') of exactly four weft yarns, spaced apart from the first column by exactly five steps (P'),
  a fourth warp yarn (58', 66', 74', 82', 90') connecting a bottom end weft yarn (18', 45', 27', 9', 36') of a column (C4', C10', C6', C2', C8') of exactly four weft yarns to the bottom end weft yarn 41' (41', 23', 5', 32', 14') of a column (C9', C5', C1', C7, C3') of exactly five weft yarns spaced apart from the preceding column by exactly two and a half steps (P'), and returning onto a bottom end weft yarn (18', 45', 27', 9', 36') of a column (C4', C10', C6', C2', C8') of exactly four weft yarns, spaced apart from the first column by exactly five steps (P').

It will thus be understood that in the base pattern of this second weave, the parallel group of four warp yarns (51', 52', 53', 54', 55', 56', 57', 58', 59', 60', 61', 62', 63', 64', 65', 66', 67', 68', 69', 70', 71', 72', 73', 74', 75', 76', 77', 78'; 79', 80', 81', 82', 83', 84', 85', 86', 87', 88', 89', 90') are longitudinally offset by a step of size 1.5 P' from plane to adjacent plane, i.e. between a plane of the first type (P1', P3', P5', P7', P9') and the adjacent plane of the second type (P2', P4', P6', P8', P10').

Between the first weave and the second weave, there is a transition zone which is described below with reference to FIGS. 20 to 22.

Figure 20:
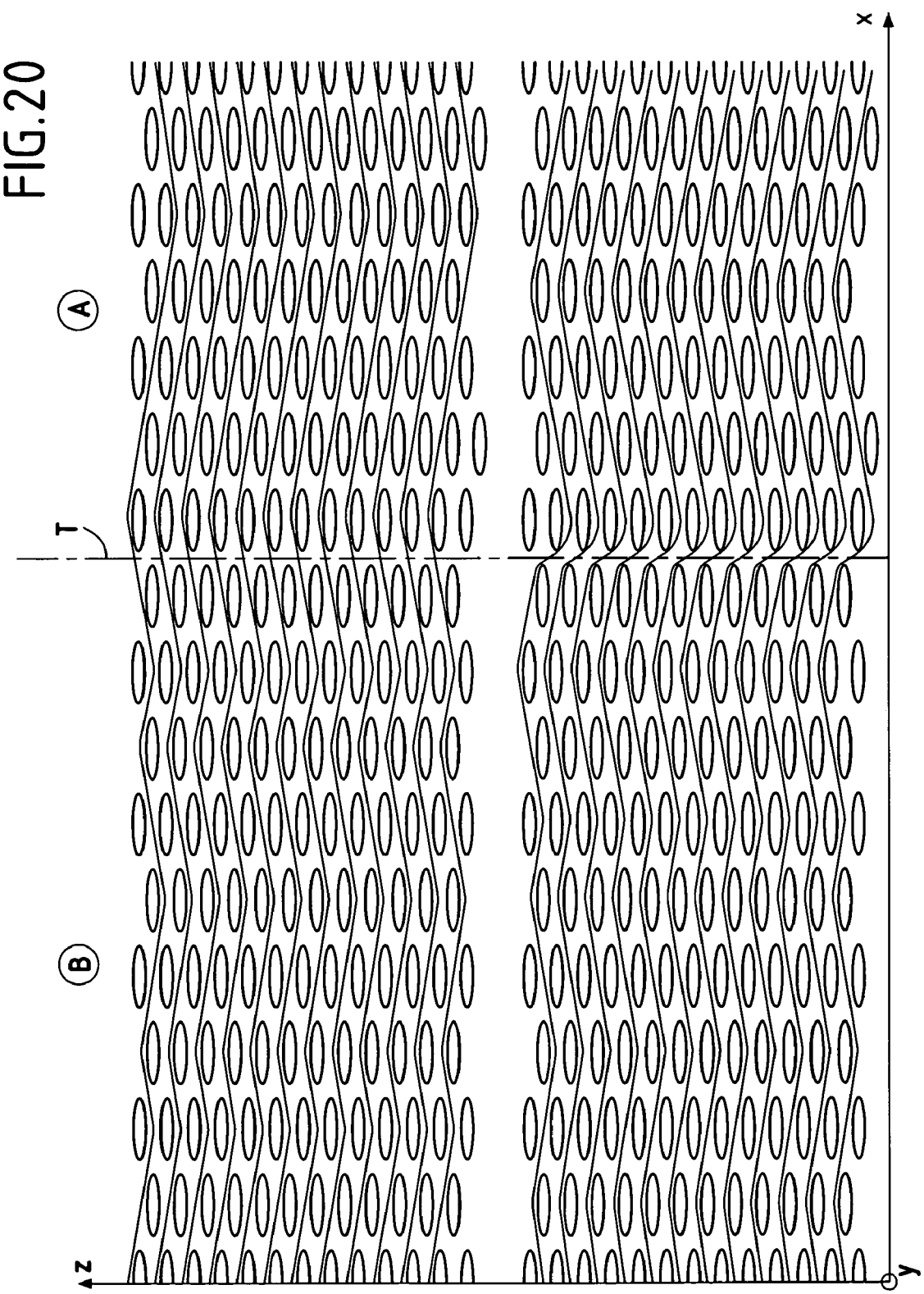
FIG. 20 is a section in the longitudinal and vertical directions showing the transition zone from the second weave B on the left to the first wave A on the right.

In FIG. 20, the transition zone is shown in section in the longitudinal and vertical directions, going from the second weave B on the left to the first weave A on the right, on either side of a vertical and transverse transition plane T represented by a chain-dotted line, the top portion of the figure showing the situation for the planes P1' (on the left) and P1 (on the right), while the bottom portion of the figure shows the situation for the planes P7' (on the left) and P2 (on the right).

Figure 21:
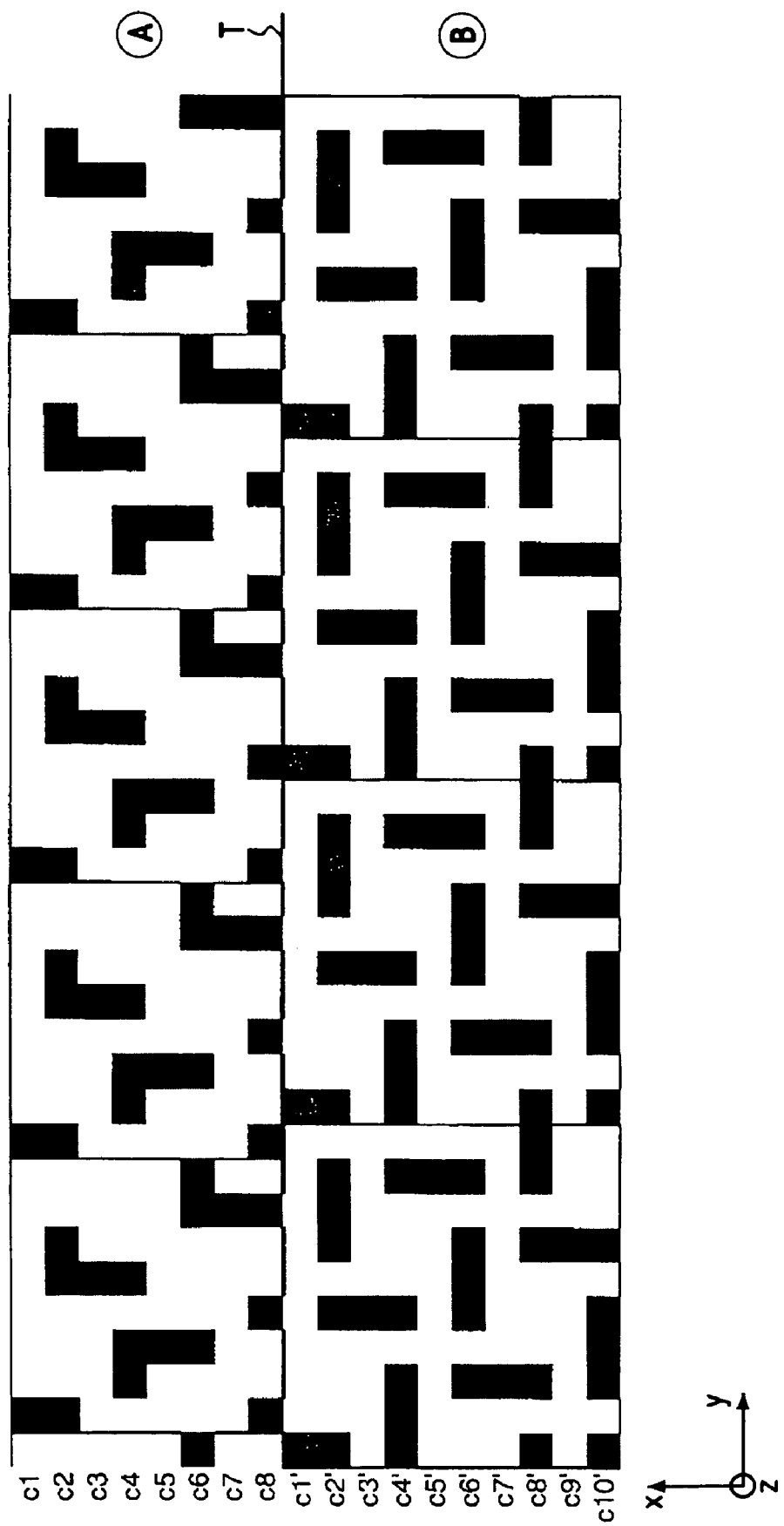
FIG. 21 shows the transition zone seen from above the preform, with the second weave B in the bottom of the figure and with the first weave A in the top of the figure.

In FIG. 21, this transition zone is represented symbolically from the top of the preform, from the second weave B in the bottom of the figure towards the first weave A in the top of the figure, on opposite sides of the vertical transition plane T represented by a line. The black portion represents the warp yarns that are visible and the white portion represents the weft yarns that are visible.

In FIG. 21, there can be seen precisely, in the bottom portion, four base patterns of the second weave (40 warp yarns forming four aligned series of columns C1' to C10'), and in the top portion there can be seen five base patterns of the first weave (40 warp yarns forming five aligned series of columns C1 to C8).

The preform as obtained in this way forms a linked multilayer assembly which can extend in the longitudinal direction indefinitely in its plane by repeating the same series of base patterns (specifically a first series for the first weave followed by a second series for the second weave).

More precisely, the length of the warp yarns and the length of the weft yarns determines the maximum length that is possible for the preform. It should be understood that, where these lengths make this possible, a plurality of preforms that can be woven end to end in the longitudinal direction by successively forming a first portion made in the first weave, a transition zone, a second portion made in the second weave, then a reverse transition zone, and a new series formed a first portion, a transition zone, a second portion, etc.

Naturally, the order in which the first and second portions are weaved can be reversed: weaving a plurality of preforms one after another in the longitudinal direction, by successively forming a second portion made in the second weave, a transition zone, a first portion made in the first weave, then a reverse transition zone, and a new series made of a second portion, a transition zone, and a first portion, etc.

At this stage, it should be observed that all of the warp yarns and all of the weft yarns are referenced when weaving continuously, so that a defect or even a break in any one of them can be identified and repaired in situ and in real time. This makes it possible to determine the nature and the position of the defects, which are then recorded, thus enabling defects that occur during weaving to be made traceable with respect to the part that is obtained from the preform.

In practice, the weaving is performed entirely automatically, by programming the loom of FIG. 1.

Thus, while manufacturing a preform for a fan blade, provision is made for the first weave A to correspond to the body of the blade and for the second weave B to correspond to the root of the blade, the base (fit) terminating in the transition zone.

It should be observed that the smallest thickness of the blade body relative to the blade root is obtained while weaving the transition zone, essentially by the change of weave between the second portion (second weave B corresponding to the blade root) and the first portion (first weave A corresponding to the blade body). By changing the weave it is possible to change the warp/weft volume ratio between the second portion (second weave B correspond to the blade root) and the first portion (first weave A corresponding to the blade body) which goes from 40/60% to 70/30%.

Similarly, as weaving progresses, a fraction of the warp yarns are withdrawn once the transition zone has been completely finished, in the first weave A corresponding to the blade body.

Figure 22:
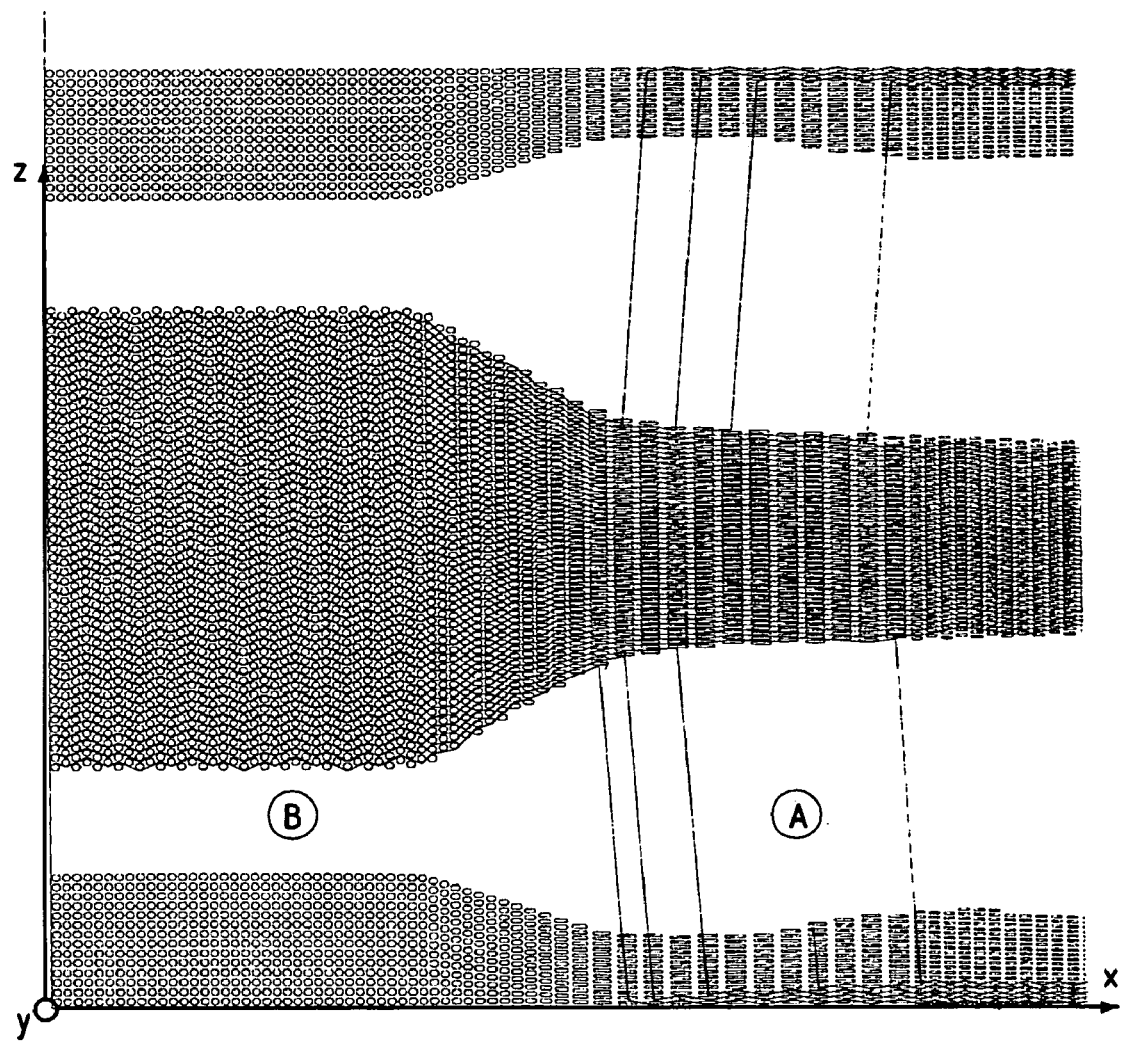
FIG. 22 is a diagrammatic section view in the longitudinal and vertical directions of a portion of a blade while mounted on the Jacquard-type loop: to the left there can be seen the root (portion B) and to the right there can be seen the airfoil of the blade (portion A)

This is shown in FIG. 22 which is a diagrammatic section view on the longitudinal and vertical directions as mounted on the Jacquard-type loom, showing a portion of a blade: on the left there is the root (portion B) and on the right there is the airfoil body (portion A). The weft yarns are shown in section, whereas the warp yarns are visible extending lengthwise from left to right.

Thus, certain warp yarns situated in the top and bottom portions are removed from the weaving of the preform that is to form the blade at the level of the first weave A corresponding to the blade body, these yarns being moved away respectively upwards and downwards onto auxiliary portions of the loom.

Figure 23:
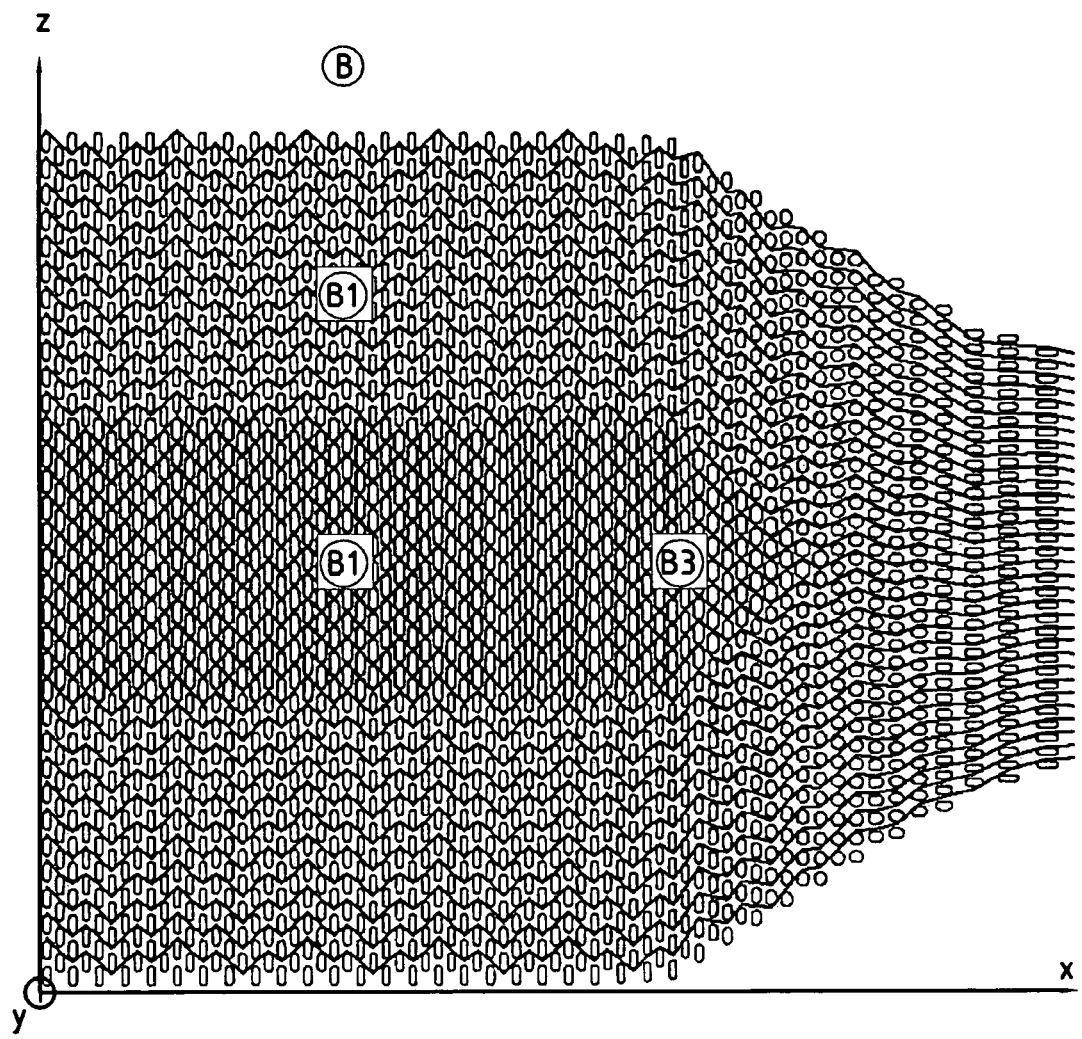
FIG. 23 is a view similar to FIG. 22 showing a portion on a larger scale for a variant embodiment of the blade.

Reference is now made to FIG. 23 which shows a variant embodiment. In this case, as for the preform shown in FIGS. 2 to 22, the warp yarns (extending from right to left) are carbon fibers presenting a count of 48,000 filaments (about 1800 tex) of the kind referred to below as yarns of normal size.

More precisely, (not shown), in order to further improve the impact strength of the blade at its surface, provision is made to use warp yarns that are finer over the entire outline of the preform, i.e. over its surface: these fine warp yarns present a count of 24,000 filaments (about 900 tex). Provision is also made for a transition underlayer between the surface and the internal portion of the preform which contains both warp yarns of normal size and fine warp yarns.

More particularly, the preform variant visible in FIG. 23 has a second portion B for forming the blade root which comprises:
  a core zone for the blade root (zone B1 in FIG. 23) made using large weft yarns presenting a count of up to 72,000 filaments (about 2700 tex) or even up to a count of 96,000 filaments (about 3600 tex);
  a zone B2 which surrounds the core zone B1 of the blade root radially and which is made using weft yarns of normal size presenting a count of 48,000 filaments (about 1800 tex); and
  a zone B3 which extends the core zone B1 of the blade root longitudinally towards the first weave A corresponding to the blade body, and of thickness (direction z) and of width (direction y) that taper: this transition zone B3 is made up simultaneously of normal size weft yarns presenting a count of 48,000 filaments (about 1800 tex) and large weft yarns presenting a count of up to 96,000 filaments (about 3600 tex).

This variant of FIG. 23 serves to further stiffen the root of the blade derived from the second weave B, in particular in its core zone B1.

Figure 24:
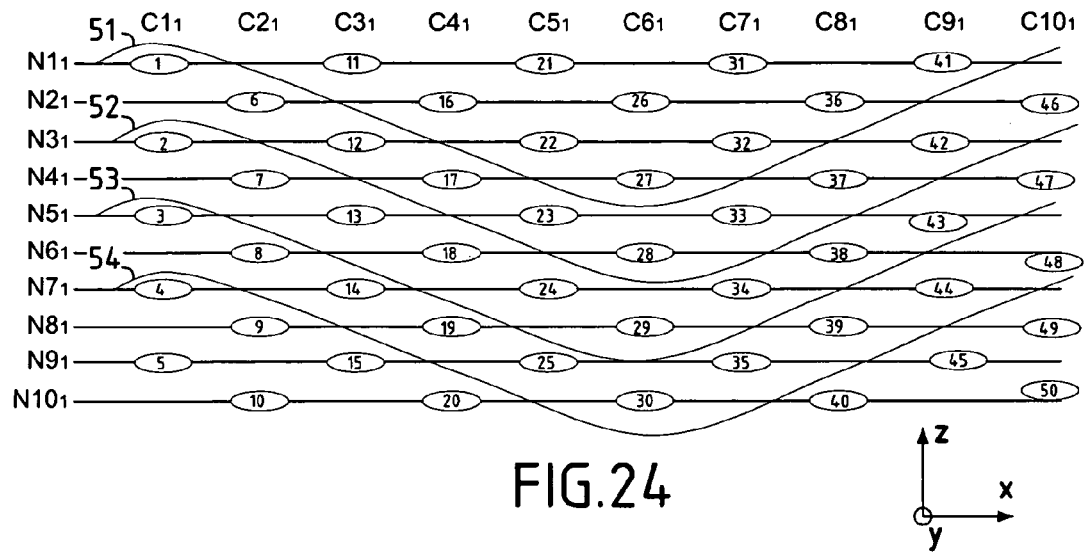
FIGS. 24 and 25 are diagrammatic section views in longitudinal and vertical directions showing the weft yarns and the warp yarns contained in a first plane respectively for first and second variant embodiments of the first weave.

Reference is now made to FIG. 24 which is a diagrammatic section in the longitudinal and vertical directions showing the weft yarns contained in a first plane of a first variant embodiment of the first weave. This first weave has fifty weft yarns 1 to 50 (which are visible in section only) disposed in a staggered configuration on ten superposed levels $N1_1$ to $N10_1$, and distributed in ten columns C11 to c101 as follows:
  a first column $C1_1$ of five superposed weft yarns 1 to 5 situated respectively at levels $N1_1$, $N3_1$, $N5_1$, $N7_1$, and $N9_1$;
  a second column C21 of five superposed weft yarns 6 to 10 situated respectively at levels $N2_1$, $N4_1$, $N6_1$, $N8_1$, and $N10_1$;
  a third column $C3_1$ of five superposed weft yarns 11 to 15 situated respectively at levels $N1_1$, $N3_1$, $N5_1$, $N7_1$, and $N9_1$;
  a fourth column $C4_1$ of five superposed weft yarns 16 to 20 situated respectively at levels $N2_1$, $N4_1$, $N6_1$, $N8_1$, and $N10_1$;

a fifth column $C1_5$ of five superposed weft yarns 21 to 25 situated respectively at levels $N1_1$, $N3_1$, $N5_1$, $N7_1$, and $N9_1$;

a sixth column $C6_1$ of five superposed weft yarns 26 to 30 situated respectively at levels $N2_1$, $N4_1$, $N6_1$, $N8_1$, and $N10_1$;

a seventh column $C7_1$ of five superposed weft yarns 31 to 35 situated respectively at levels $N1_1$, $N3_1$, $N5_1$, $N7_1$, and N91;

an eighth column $C8_1$ of five superposed weft yarns 36 to 40 situated respectively at levels $N2_1$, $N4_1$, $N6_1$, $N8_1$, and $N10_1$;

a ninth column $C9_1$ of five superposed weft yarns 41 to 45 situated respectively at levels $N_1$, $N3_1$, $N5_1$, $N7_1$, and $N9_1$; and a tenth column $C10_1$ of five superposed weft yarns 46 to 50 situated respectively at levels $N2_1$, $N4_1$, $N6_1$, $N8_1$, and $N10_1$.

The weft yarns 1 to 50 are interconnected by 35 warp yarns which are disposed in ten parallel planes which follow one another in the transverse direction, being regularly offset from one another at a step size that remains identical and that lies in the range 1.5 mm to 3 mm, and is preferably equal to 2.1 mm.

Each of these planes contains three or four superposed parallel warp yarns, with the disposition of the first plane, as shown in FIG. 24, being as follows:

A first warp yarn 51 connects the top end weft yarn 1 of the column $C1_1$ to the upper intermediate weft yarn 27 of the column $C6_1$ (downwards), and it returns (upwards) onto the top end weft yarn, corresponding to yarn 1 in the following base pattern. A second warp yarn 52 connects the upper intermediate weft yarn 2 of the column $C1_1$ to the middle weft yarn 28 of the column $C6_1$ (downwards), and it returns (upwards) onto the upper intermediate weft yarn, corresponding to yarn 2 in the following base pattern. A third warp yarn 53 connects the middle weft yarn 3 of the column $C1_1$ to the lower intermediate weft yarn 29 of the column $C6_1$ (downwards), and it returns (upwards) onto the middle weft yarn corresponding to yarn 3 in the following base pattern. A fourth warp yarn 54 connects the lower intermediate weft yarn 4 of the column $C1_1$ to the bottom end weft yarn 30 of the column $C6_1$ (downwards), and it returns (upwards) onto the lower intermediate weft yarn, corresponding to yarn 4 in the following base pattern.

Figure 25:
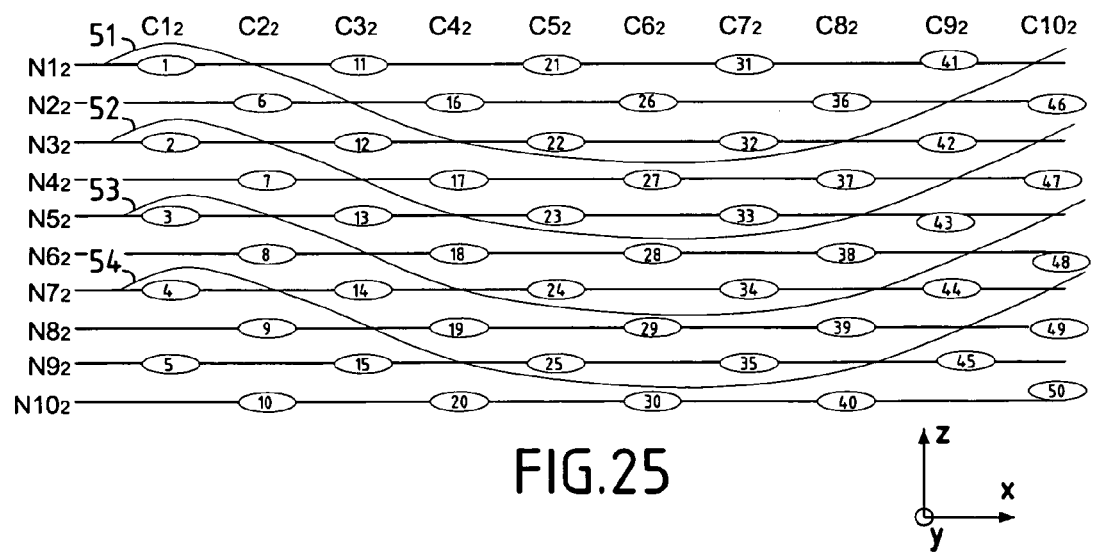

FIG. 25 is a diagrammatic section in the longitudinal and vertical directions of the weft yarns contained in a first plane of a second variant embodiment of the first weave.

This first weave comprises fifty weft yarns 1 to 50 (shown in section), disposed in a staggered configuration on ten superposed layers $N1_2$ to $N10_2$, and distributed in ten columns $C1_2$ to $C10_2$ in the same disposition as for the first variant of FIG. 24.

The weft yarns 1 to 50 are interconnected by forty warp yarns which are disposed in ten parallel planes which follow one another in the transverse direction, being regularly offset from one another by a step size that is always identical and that lies in the range 1.5 mm to 3 mm, preferably being equal to 2.1 mm.

Each of these planes contains four superposed parallel warp yarns, the disposition of the first plane, shown in FIG. 25, being as follows:

A first warp yarn 51 connects the top end weft yarn 1 of the column $C1_2$ to the top intermediate weft yarns 22 and 32 of columns $C5_2$ and $C7_2$ (downwards), and it returns (upwards) onto the top end weft yarn, corresponding to yarn 1 in the following base pattern. A second warp yarn 52 connects the upper intermediate weft yarn 2 of the column $C1_2$ to the middle weft yarn 23 and 33 of the columns $C5_2$ and $C7_2$ (downwards), and it returns (upwards) onto the upper intermediate weft yarn, corresponding to the yarn 2 in the following base pattern. A third warp yarn 53 connects the middle weft yarn 3 of the column $C1_2$ to the lower intermediate weft yarns 24 and 34 of the columns $C5_2$ and $C7_2$ (downwards), and it returns (upwards) onto the middle weft yarn, corresponding to yarn 3 in the following base pattern. A fourth warp yarn 54 connects the lower intermediate weft yarn 4 of the column $C1_2$ to the bottom end weft yarns 25 and 35 of the columns $C5_2$ to $C7_2$ (downwards), and it returns (upwards) onto the lower intermediate weft yarn corresponding to yarn 4 in the following base pattern.

Figure 26:
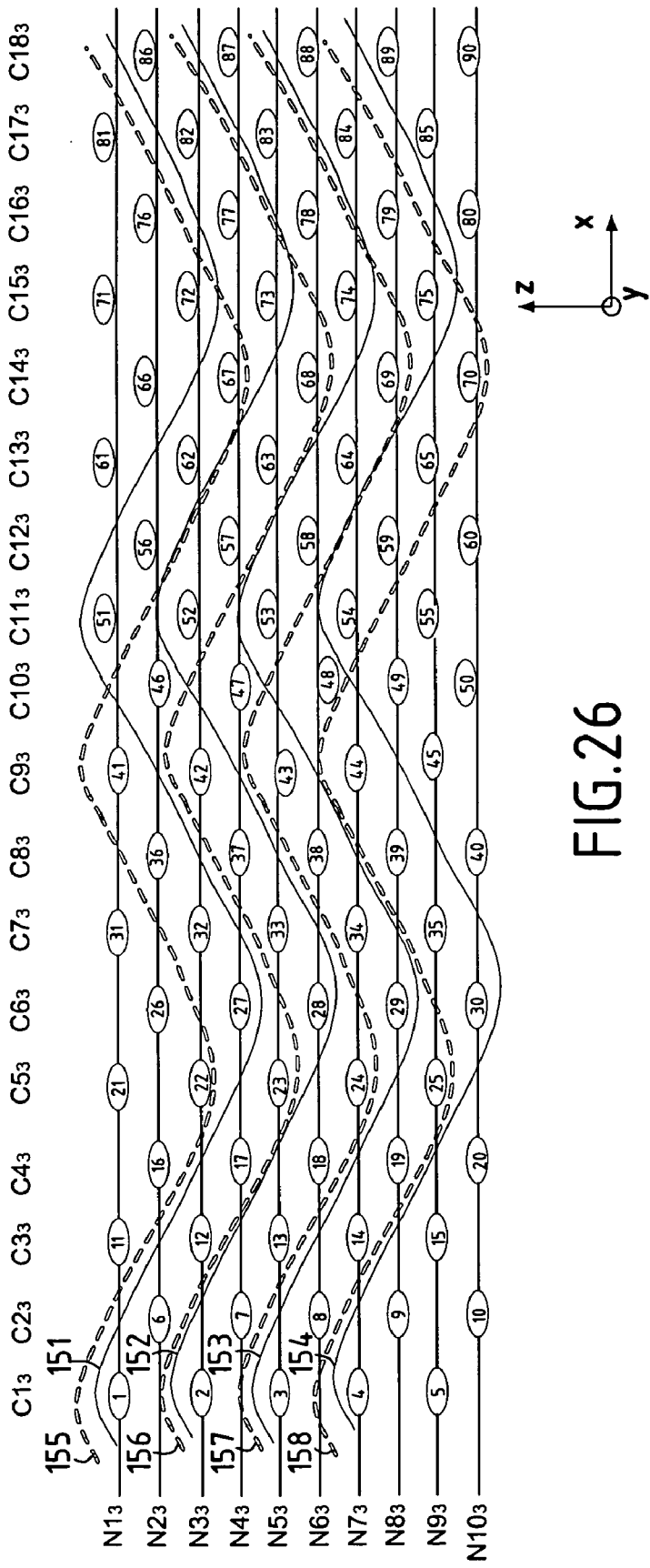
FIG. 26 is a diagrammatic view in section on the longitudinal and vertical directions showing the warp yarns and the weft yarns contained in a first plane and in a second plane in a third variant embodiment of the first weave.

FIG. 26 is a diagrammatic section in the longitudinal and vertical directions showing the weft yarns contained in a first plane and in a second plane of a third variant embodiment of the first weave.

This first weave comprises ninety weft yarns 1 to 90 (visible in section) disposed in a staggered configuration on ten superposed levels $N1_3$ to $N10_3$, and distributed in eighteen columns $C1_3$ to $C18_3$ in the same disposition as in the first variant of FIG. 24.

The weft yarns 1 to 90 are interconnected by sixty-three warp yarns which are disposed in eighteen parallel planes following one another in the transverse direction and regularly offset from one another at an identical step size lying in the range 1.5 mm to 3 mm, and preferably equal to 2.1 mm.

Each of these planes contains three or four superposed parallel warp yarns, the disposition of the first and second planes visible in FIG. 26 being as follows:

In the first plane (warp yarns in continuous lines), a first warp yarn 151 connects the top end weft yarn 1 of the column $C1_3$ to the upper intermediate weft yarn 27 of the column $C6_3$ (downwards), it returns (upwards) onto the top end weft yarn 51 of the column $C11_3$, it returns (downwards) under the top end weft yarn 72 of the column $C15_3$, and it returns (upwards) onto the top end weft yarn corresponding to yarn 1 in the following base pattern. A second warp yarn 152 connects the upper intermediate warp yarn 2 of the column $C1_3$ to the middle weft yarn 23 of the column $C6_3$ (downwards), it returns (upwards) onto the upper intermediate weft yarn 52 of the column $C11_3$, it returns (downwards) under the middle weft yarn 73 of the column $C15_3$, and it returns (upwards) onto the upper intermediate weft yarn, correspond to yarn 2 in the following base pattern. A third warp yarn 153 connects the middle weft yarn 3 of the column $C1_3$ to the lower intermediate weft yarn 29 of the column $C6_3$ (downwards), it returns (upwards) onto the middle weft yarn 53 of the column $C11_3$, it returns (downwards) under the lower intermediate weft yarn 74 of the column $C15_3$, and it returns (upwards) onto the middle weft yarn, corresponding to the yarn 3 in the following base pattern. A fourth warp yarn 154 connects the lower intermediate weft yarn 4 of the column $C1_3$ to the bottom end weft yarn 30 of the column $C6_3$ (downwards), it returns (upwards) onto the lower intermediate weft yarn 54 of the column $C11_3$, it returns (downwards) under the bottom end weft yarn 75 of the column $C15_3$, and it returns (upwards) onto the lower intermediate weft yarn, corresponding to yarn 4 in the following base pattern.

In the second plane (warp yarns shown in dashed lines in FIG. 26), a first warp yarn 155 connects the top end weft yarn 1 of the column $C1_3$ to the upper intermediate weft yarn 22 of the column $C5_3$ (downwards), it returns (upwards) onto the top end weft yarn 41 of the column $C9_3$, it returns (downwards) under the lower intermediate weft yarn 67 of the column $C14_3$, and it returns (upwards) onto the top end weft yarn, corresponding to the yarn 1 in the following base pattern. A second warp yarn 156 connects the upper intermediate weft yarn 2 of the column $C1_3$ to the middle weft yarn 23 of the column $C5_3$ (downwards), it returns (upwards) onto the top intermediate weft yarn 42 of the column $C9_3$, it returns (downwards) under the middle weft yarn 68 of the column $C14_3$, and it returns (upwards) onto the upper intermediate weft yarn, corresponding to the yarn 2 in the following base pattern. A third warp yarn 157 connects the middle weft yarn 3 of the column $C1_3$ to the lower intermediate weft yarn 24 of the column $C5_3$ (downwards), it returns (upwards) onto the middle weft yarn 43 of the column $C9_3$, it returns (downwards) under the lower intermediate weft yarn 69 of the column $C14_3$, and it returns (upwards) onto the middle weft yarn, corresponding to yarn 3 in the following base pattern. A fourth warp yarn 158 connects the lower intermediate weft yarn 4 of the column $C1_3$ to the bottom end weft yarn 25 of the column $C5_3$ (downwards), it returns (upwards) onto the lower intermediate weft yarn 44 of the column $C9_3$, it returns (downwards) under the bottom end weft yarn 70 of the column $C14_3$, and it returns (upwards) onto the lower intermediate weft yarn, corresponding to the yarn 4 in the following base pattern.

In general, the yarns may be selected, in particular carbon yarns, having a count lying in the range 6000 filaments (225 tex) to 96,000 filaments (3600 tex).

The present invention is also not limited to the weaves described above, the shrinkage angle of the warp yarns being maintained at a low value, preferably in the range 2° to 10°, and the step size of the weft lying in the range 0.2 mm to 5 mm.

It should also be observed (in an example not shown) that it is possible to cause the count of the warp yarns to vary on the surface between the trailing edge and the leading edge, the warp yarns then being finer beside the leading edge in order to improve cohesion, and thus improve mechanical strength at this location which is particularly subjected to high stresses in operation.

In the invention, a fan blade is provided for a turbojet, in which the blade has at least a first portion and at least a second portion that extend in succession in the longitudinal direction and that present dimensions and/or mechanical properties that differ by performing the following manufacturing method.

Firstly, a preform as described above is made by three-dimensional weaving.

Thereafter the preform is cut out, e.g. using a laser beam or a water jet, to have the shape and the dimensions of the first portion and the second portion of the blade.

Because the woven preform is flexible, it adapts to the shape of the mold and it is therefore possible merely to cut around the outline of the preform following a vertical path.

The following step consists in placing the cut-out preform in a mold that can be closed in sealed manner and that has a recess with the shape and dimensions of the final part that is to be molded. It should be understood that during this step the preform may be subjected to twisting, so as to take up the final shape of the blade, and thus of the mold.

Thereafter, the mold is closed and a binder is injected into the mold recess in order to impregnate the entire cut-out preform, which binder comprises a thermosetting resin. Finally, the mold is heated so as to polymerize the resin and harden the part. After the mold has been opened, the final molded part can be ejected in the form of a finished article ready for mounting and/or using.

In an example of a composite blade made in accordance with the invention and using a preform of the type shown in FIGS. 2 to 22, specifically a preform made using high strength carbon fibers with a density equal to 1.79 grams per cubic centimeter ($g/cm^3$), the following parameters were used:

first weave A (blade body in its thickest portion in the center): 18 levels of warp yarns spaced apart in the transverse direction at a step size of 2.1 mm, after densification using the liquid technique of resin transfer molding (RTM), said first weave A having a thickness of 20 mm, a step size P equal to 10 mm (i.e. a weft structure of 1 yarn/cm), a mean value of 40 for the connection or shrinkage angle of the warp yarns, a fiber volume ratio of 60%, a ratio of warp yarns to weft yarns of 69/31%, a total fabric weight of 21,500 grams per square meter ($g/m^2$), a weft weight of 6600 $g/m^2$ (distributed amongst 37 levels of weft yarns, i.e. 180 $g/m^2$ for each weft level); and second weave B (blade root in its thickest portion in the center): 32 levels of warp yarns spaced apart in the transverse direction at a step size of 2.1 mm, after being densified by the liquid injection method of resin transfer molding (RTM), said second weave B having a thickness of 79 mm, a step size P' along the longitudinal direction equal to 2.8 mm (i.e. a weft structure of 3.57 yarns/cm), a mean value of 3° for the contraction (or shrinkage) angle of the warp yarns, a fiber volume ratio of 49%, a ratio of warp fibers to weft fibers of 40/60%, a total fabric weight of 69,000 $g/m^2$, a weft weight of 41,700 $g/m^2$ (distributed as 65 weft yarn levels, i.e. 640 $g/m^2$ for each yarn level).

The carbon fibers that were used presented the following intrinsic mechanical characteristics:

E (Young's modulus of elasticity)=280 gigapascals (GPa);

σ (breaking stress)=5.5 GPa.

For the binder, a high performance epoxy resin was used, as sold under the reference PR 520 by the supplier CYTEC.

With such a composite material, the following mechanical properties were obtained:

| first weave A (blade body): | |
| --- | --- |
| E warp (traction) ≧ | 90 GPa |
| E weft (traction) ≧ | 40 GPa |
| σ warp (traction) ≧ | 700 megapascals (MPa) |
| σ weft (traction) ≧ | 210 MPa |
| σ warp (compression) ≧ | 450 MPa |
| σ weft (compression) ≧ | 200 MPa |
| second weave B (root and base or fit) | |
| E warp (traction) ≧ | 30 GPa |
| E weft (traction) ≧ | 80 GPa |
| σ warp (traction) ≧ | 300 MPa |
| σ weft (traction) ≧ | 500 MPa |
| σ warp (compression) ≧ | 200 MPa |
| σ weft (compression) ≧ | 500 MPa |

By way of comparison, it should also be observed that compression strength of the "2.5D" or "interlock" weave (see teaching of document FR 2 610 950) is 300 MPa, compared with the value of 450 MPa obtained with the first weave for the preform of the invention.

The blade of the present invention comprising a preform of yarns or fibers woven in three dimensions is thus preferably used for making a fan blade, in particular a blade of large chord, out of composite material and for an airplane engine, in particular for a turbojet.

It should be observed that in order to make this preform, carbon fiber could be replaced by fibers of other types, such as glass fibers, aramid fibers, silica fibers, or ceramic fibers.

In addition, the preform may not only be transformed by the RTM liquid injection method for obtaining a structural composite material, but it could also be transformed by any other injection technique or by any other suitable technique such as vacuum infusion.

What is claimed is:

1. A composite turbomachine blade comprising a preform of yarns or fibers woven in three dimensions and a binder maintaining the relative disposition between the yarns of the preform, said preform being made up of warp yarns and of weft yarns, the direction of the warp yarns forming the longitudinal direction of the preform, wherein said preform comprises at least a first portion made with a first weave and forming the airfoil of the blade, and a second portion made using a second weave and forming the root of the blade, and wherein the first portion and the second portion are united by a transition zone in which the first weave is progressively modified to end up with the second weave, thereby obtaining a reduction at least in the thickness of the blade between the second portion and the first portion.

2. A blade according to claim 1, wherein said first portion and said second portion do not present the same number of warp yarns.

3. A blade according to claim 1, wherein said yarns or fibers belong to the group constituted by carbon fibers, glass fibers, silica fibers, silicon carbide fibers, aluminum fibers, aramid fibers, and aromatic polyamide fibers.

4. A blade according to claim 1, wherein the shrinkage angle of the warp yarns lies in the range 2° to 10°.

5. A blade according to claim 1, wherein said first portion and said second portion present different warp/weft volume ratios.

6. A blade according to claim 5, wherein said first portion presents a warp/weft volume ratio lying in the range 80/20% to 50/50%, and wherein said second portion presents a warp/weft volume ratio lying in the range 30/70% to 50/50%.

7. A blade according to claim 1, wherein the count of the warp yarns varies between the edge and the remainder of the blade, the warp yarns at the edge being finer.

8. A blade according to claim 7, wherein the count of the warp yarns at the edge of the blade is about 900 tex and wherein the count of the warp yarns in the remainder of the blade is about 1800 tex.

9. A blade according to claim 1, wherein the first weave presents a base pattern comprising firstly at least thirty-six weft yarns disposed in a staggered configuration of columns having at least four weft yarns superposed in a vertical direction and spaced apart in a longitudinal direction by a step size, alternating with columns of at least five superposed weft yarns, the columns being separated by the same step size, the weft yarns being distributed in at least eight columns extending in a vertical direction, the weft yarns thus being disposed on at least nine levels, and secondly at least twenty-four warp yarns disposed in at least eight vertical planes that are parallel to one another in a transverse direction alternating between planes of a first type containing at least four superposed parallel warp yarns, and planes of a second type containing at least three superposed parallel warp yarns, said planes of a first type having:

a first warp yarn connecting a top end weft yarn of a column of at least five weft yarns to the upper intermediate weft yarn of a column of at least five weft yarns spaced apart from the preceding column by at least two steps, and returning onto a top end weft yarn) of a column of at least five weft yarns, spaced apart from the first column by at least four steps, a second warp yarn connecting an upper intermediate weft yarn of a column of at least five weft yarns to the middle weft yarn of a column of at least five weft yarns spaced apart from the preceding column by at least two steps, and returning onto an upper intermediate weft yarn of a column of at least five weft yarns, spaced apart from the first column by at least four steps, a third warp yarn connecting a middle weft yarn of a column of at least five weft yarns to the lower intermediate weft yarn of a column of at least five weft yarns spaced apart from the preceding column by at least two steps, and returning onto a middle weft yarn of a column of at least five weft yarns, spaced apart from the first column by at least four steps, a fourth warp yarn connecting a lower intermediate weft yarn of a column of at least five weft yarns to the bottom end weft yarn of a column of at least five weft yarns spaced apart from the preceding column by at least two steps, and returning onto a lower intermediate weft yarn of a column of at least five weft yarns, spaced apart from the first column by at least four steps, said planes of a second type having:

a first warp yarn connecting a top end weft yarn of a column of at least four weft yarns to the upper intermediate weft yarn of a column of at least four weft yarns spaced apart from the preceding column by at least two steps, and returning onto a top end weft yarn of a column of at least four weft yarns, spaced apart from the first column by at least four steps, a second warp yarn connecting an upper intermediate weft yarn of a column of at least four weft yarns to the lower intermediate weft yarn of a column of at least four weft yarns spaced apart from the preceding column by at least two steps, and returning onto an upper intermediate weft yarn of a column of at least four weft yarns, spaced apart from the first column by at least four steps, a third warp yarn connecting a lower intermediate weft yarn of a column of at least four weft yarns to the bottom end weft yarn of a column of at least four weft yarns spaced apart from the preceding column by at least two steps, and returning onto a lower intermediate weft yarn of a column of at least four weft yarns, spaced apart from the first column by at least four steps.

10. A blade according to claim 1, wherein the second weave presents a base pattern comprising firstly at least forty-five weft yarns disposed in a staggered configuration of columns of at least four weft yarns superposed in a vertical direction, the columns being separated in a longitudinal direction by a step size, and being in a staggered configuration relative to columns of at least five superposed weft yarns, the columns being separated by the same step size, the weft yarns being distributed in at least ten columns extending in a vertical direction, the weft yarns thus being disposed on at least nine levels, and secondly at least forty warp yarns disposed in at least ten vertical planes that are parallel to one another in a transverse direction, each plane containing at least four superposed parallel warp yarns with alternating planes of a first type and planes of a second type, said planes of a first type having:

a first warp yarn connecting a top end weft yarn of a column of at least five weft yarns to the top end weft yarn of a column of at least four weft yarns spaced apart from the preceding column by at least two and a half steps, and returning onto a top end weft yarn of a column of at least five weft yarns, spaced apart from the first column by at least five steps, a second warp yarn connecting an upper intermediate weft yarn of a column of at least five weft yarns to the upper intermediate weft yarn of a column of at least four weft yarns spaced apart from the preceding column by at least two and a half steps, and returning onto an upper intermediate weft yarn of a column of at least five weft yarns, spaced apart from the first column by at least five steps, a third warp yarn connecting a middle weft yarn of a column of at least five weft yarns to the lower intermediate weft yarn of a column of at least four weft yarns spaced apart from the preceding column by at least two and a half steps, and returning onto a middle weft yarn of a column of at least five weft yarns, spaced apart from the first column by at least five steps, a fourth warp yarn connecting a lower intermediate weft yarn of a column of at least five weft yarns to the bottom end weft yarn of a column of at least four weft yarns spaced apart from the preceding column by at least two and a half steps, and returning onto a lower intermediate weft yarn of a column of at least five weft yarns, spaced apart from the first column by at least five steps, said planes of a second type having:

a first warp yarn connecting a top end weft yarn of a column of at least four weft yarns to the upper intermediate weft yarn of a column of at least five weft yarns spaced apart from the preceding column by at least two and a half steps, and returning onto a top end weft yarn of a column of at least four weft yarns, spaced apart from the first column by at least five steps, a second warp yarn connecting an upper intermediate weft yarn of a column of at least four weft yarns to the middle weft yarn of a column of at least five weft yarns spaced apart from the preceding column by at least two and a half steps, and returning onto an upper intermediate weft yarn of a column of at least four weft yarns, spaced apart from the first column by at least five steps, a third warp yarn connecting a lower intermediate weft yarn of a column of at least four weft yarns to the lower intermediate weft yarn of a column of at least five weft yarns spaced apart from the preceding column by at least two and a half steps, and returning onto a lower intermediate weft yarn of a column of at least four weft yarns, spaced apart from the first column by at least five steps, a fourth warp yarn connecting a bottom end weft yarn of a column of at least four weft yarns to the bottom end weft yarn of a column of at least five weft yarns spaced apart from the preceding column by at least two and a half steps, and returning onto a bottom end weft yarn of a column of at least four weft yarns, spaced apart from the first column by at least five steps, the parallel groups of four warp yarns being offset longitudinally by a step of the same size as the step from one plane to the adjacent plane.

11. A blade according to claim 1, wherein the second portion of the blade presents a core zone with weft yarns that are larger, having a count that is different from that of the weft yarns surrounding said core zone.

12. A blade according to claim 11, wherein the count of the weft yarns in the core zone of the second portion of the blade is about 3600 tex and wherein the count of the weft yarns surrounding said core zone is about 1800 tex.

13. A blade according to claim 1, wherein said binder belongs to the group formed by organic resins, refractory substances, and metals.

14. A blade according to claim 1, constituting a fan blade for a turbojet.

15. A method of manufacturing a fan blade for a turbojet, the method comprising the following steps:

weaving warp yarns and weft yarns so as to form a preform of yarns or fibers that is woven in three dimensions, being made up of warp yarns and weft yarns, the direction of the warp yarns forming the longitudinal direction of the preform, said preform including at least a first portion made with a first weave and a second portion made with a second weave, said first portion and said second portion being united by a transition zone in which the first weave is progressively modified to end up with the second weave, thereby obtaining a reduction at least in the thickness of the blade between the second portion and the first portion;

cutting said preform to the shape and dimensions of the component portions of the blade;

providing a mold in which said preform is placed;

injecting a binder into said mold in order to impregnate the entire preform, the binder comprising a thermosetting resin;

heating said mold; and extracting a molded part from the mold.

\* \* \* \* \*